(12) United States Patent
Kikuchi et al.

(10) Patent No.: US 11,910,067 B2
(45) Date of Patent: Feb. 20, 2024

(54) CONTENT PROVIDING SYSTEM, CONTENT PROVIDING METHOD, AND CONTENT PROVIDING PROGRAM

(71) Applicant: NEC NETWORKS & SYSTEM INTEGRATION CORPORATION, Tokyo (JP)

(72) Inventors: Osamu Kikuchi, Tokyo (JP); Yasuaki Tsunemi, Tokyo (JP); Yukiko Einaga, Tokyo (JP); Tomonori Kaizaki, Tokyo (JP); Makoto Kawamura, Tokyo (JP); Satoshi Kobayashi, Tokyo (JP); Tomomi Abe, Tokyo (JP); Xuan Han, Tokyo (JP); Ryuki Kitagawa, Tokyo (JP)

(73) Assignee: NEC NETWORKS & SYSTEM INTEGRATION CORPORATION, Tokyo (JP)

( * ) Notice: Subject to any disclaimer, the term of this patent is extended or adjusted under 35 U.S.C. 154(b) by 265 days.

(21) Appl. No.: 17/285,582

(22) PCT Filed: Feb. 4, 2019

(86) PCT No.: PCT/JP2019/003905
§ 371 (c)(1),
(2) Date: Apr. 15, 2021

(87) PCT Pub. No.: WO2020/161776
PCT Pub. Date: Aug. 13, 2020

(65) Prior Publication Data
US 2022/0295157 A1 Sep. 15, 2022

(51) Int. Cl.
*H04N 21/81* (2011.01)
*H04L 65/403* (2022.01)
*H04N 21/45* (2011.01)

(52) U.S. Cl.
CPC ......... *H04N 21/812* (2013.01); *H04L 65/403* (2013.01); *H04N 21/4532* (2013.01)

(58) Field of Classification Search
CPC ............. H04N 21/812; H04N 21/4532; H04N 21/25891; H04N 21/42203;
(Continued)

(56) References Cited

U.S. PATENT DOCUMENTS 6,032,130 A * 2/2000 Alloul ................ G06Q 30/0234
 705/14.34
8,319,816 B1 * 11/2012 Swanson ............. H04L 12/1818
 370/352

(Continued)

FOREIGN PATENT DOCUMENTS

JP 2004-178330 A 6/2004
JP 2009-258975 A 11/2009
(Continued)

OTHER PUBLICATIONS

International Search Report (English and Japanese) of the International Searching Authority issued in PCT/JP2019/003905, dated Feb. 26, 2019; ISA/JP (3 pages).

*Primary Examiner* — Timothy R Newlin
(74) *Attorney, Agent, or Firm* — Harness, Dickey & Pierce, P.L.C.

(57) ABSTRACT

A content providing system is provided that includes a client terminal and a server, and provides content based on a use state of the client terminal. The client terminal includes a client control unit and a display unit. The server includes a client terminal management unit, a content recording unit, a content management unit, a content distribution control unit, and a distribution condition management unit. The client control unit secures a content frame based on a distribution condition notified from the distribution condition management unit, and transmits a distribution request of the content (Continued)

to the content distribution control unit. The content distribution control unit extracts and distributes the content from the content recording unit, and the client control unit displays the content distributed by the content distribution control unit on the display unit within the content frame.

13 Claims, 18 Drawing Sheets

(58) Field of Classification Search
CPC .. H04N 21/4223; H04N 21/4788; H04N 7/15; H04L 65/403; G06F 13/00
See application file for complete search history.

(56) References Cited

U.S. PATENT DOCUMENTS

| | | | | |
|---|---|---|---|---|
| 8,997,007 | B1* | 3/2015 | Bennett | H04N 21/41407 715/753 |
| 9,832,372 | B1* | 11/2017 | Conway, Sr. | H04L 65/403 |
| 10,142,685 | B2* | 11/2018 | Arsenault | H04N 21/44218 |
| 10,575,045 | B1* | 2/2020 | Kruse | H04N 21/47815 |
| 10,904,067 | B1* | 1/2021 | Higgs | H04L 65/403 |
| 2001/0051900 | A1* | 12/2001 | Fisher | H04N 21/4126 705/26.1 |
| 2002/0116265 | A1* | 8/2002 | Hernandez | H04N 21/25866 348/E7.071 |
| 2003/0061271 | A1* | 3/2003 | Pittarelli | H04M 11/085 348/E7.083 |
| 2004/0218047 | A1* | 11/2004 | Goodman | G07F 17/16 348/E5.042 |
| 2004/0263636 | A1* | 12/2004 | Cutler | H04N 7/15 348/211.3 |
| 2008/0088698 | A1* | 4/2008 | Patel | H04N 7/15 348/E7.083 |
| 2009/0204479 | A1* | 8/2009 | Wolinsky | G06Q 30/0259 705/14.57 |
| 2010/0005489 | A1* | 1/2010 | Losey | H04N 21/812 725/38 |
| 2011/0196745 | A1* | 8/2011 | Moriya | H04N 21/41415 705/14.67 |
| 2014/0313276 | A1* | 10/2014 | Cho | H04N 7/147 348/14.07 |
| 2014/0372921 | A1* | 12/2014 | Efrati | G06F 3/0484 715/766 |
| 2015/0058252 | A1* | 2/2015 | Richardson | H04L 51/234 705/345 |
| 2015/0128017 | A1* | 5/2015 | Fithian | G06F 40/134 715/205 |
| 2016/0072915 | A1* | 3/2016 | Decanne | G06F 3/147 715/728 |
| 2016/0328741 | A1* | 11/2016 | Borger | G06V 40/168 |
| 2017/0102902 | A1* | 4/2017 | Ohishi | G06F 3/1204 |
| 2019/0342626 | A1* | 11/2019 | Hernandez | H04N 21/4532 |
| 2020/0052920 | A1* | 2/2020 | Kwatra | H04M 3/565 |
| 2021/0092483 | A1* | 3/2021 | Bowman | H04N 21/41407 |
| 2022/0342623 | A1* | 10/2022 | Adachi | G06F 21/32 |
| 2023/0033852 | A1* | 2/2023 | Avrunin | H04N 7/155 |

FOREIGN PATENT DOCUMENTS

| | | |
|---|---|---|
| JP | 2009-260610 A | 11/2009 |
| JP | 5188865 B2 | 4/2013 |
| JP | 5650615 B2 | 1/2015 |

* cited by examiner

Fig. 2(A)

(A) TERMINAL INFORMATION TABLE

| CLIENT TERMINAL ID | INSTALLATION PLACE | REGION | DISTRIBUTION PERMITTANCE | VIEWER ATTRIBUTE ||| DISTRIBUTION EXCLUDED CONTENT || CONTENT FRAME SECURING CONDITION | CONTENT STORED LOCATION |
| --- | --- | --- | --- | --- | --- | --- | --- | --- | --- | --- |
| | | | | GENDER | AGE | OCCUPATION | CONTENT TYPE | EXCLUDED CONTENT OWNER | | |
| R001 | COMPANY A, 1ST FLOOR, NORTH AREA | TOKYO | YES | MALE | ALL | ENGINEER | — | — | UNUSED STATE (300 SECONDS) | https://www.○○○ |
| R002 | COMPANY A, 1ST FLOOR, SOUTH AREA | TOKYO | NO | — | — | — | — | — | — | — |
| R003 | COMPANY A, 2ND FLOOR, NORTH AREA | TOKYO | YES | ALL | 20~40 | SALES | — | — | UNUSED STATE (600 SECONDS) | https://www.×× |
| R004 | COMPANY B, 5TH FLOOR | KANAGAWA | YES | FEMALE | 30~60 | GENERAL AFFAIR | EATING AND DRINKING | COMPANY Z | SPECIFIC INPUT OPERATION (5-POINT TOUCH) | https://www.▲▲▲ |
| R005 | COMPANY B, 10TH FLOOR | KANAGAWA | YES | ALL | 20~50 | SALES | — | — | VOICE COMMAND (XXXXX) | https://www.××× |
| R006 | COMPANY C, 4TH FLOOR, CENTRAL AREA | CHIBA | YES | FEMALE | ALL | ALL | — | — | TERMINATION OF VIDEOCONFERENCE SYSTEM | https://www.●●● |

Fig. 2(B)

(B) MASTER TABLE

| GENDER | AGE    | OCCUPATION      | CONTENT TYPE      | REGION   |
|--------|--------|-----------------|-------------------|----------|
| ALL    | ALL    | ALL             | PERSONAL COMPUTER | ALL      |
| MALE   | TWENTIES | SALES         | SUITS             | TOKYO    |
| FEMALE | THIRTIES | ENGINEER      | SHOES             | KANAGAWA |
|        | FORTIES | HUMAN RESOURCES | COSMETICS        | CHIBA    |
|        | FIFTIES | GENERAL AFFAIR | EATING AND DRINKING | OSAKA  |
|        | SIXTIES | OFFICE WORK   | TRAVELS           | NAGOYA   |

Fig. 3(A)

(A) CONTENT INFORMATION TABLE

| DISTRIBUTION CONTENT ID | CONTENT OWNER | CONTENT TYPE | TARGET ATTRIBUTE ||||| DISTRIBUTION PERIOD | DISTRIBUTION TIME | REGION |
| | | | GENDER | AGE | OCCUPATION | | | | |
|---|---|---|---|---|---|---|---|---|---|
| C001 | COMPANY W | PERSONAL COMPUTER | MALE | 20~40 | ENGINEER | | 4-10.2018 | 0:00-0:00 | ALL |
| C002 | COMPANY X | SUITS | ALL | ALL | SALES | | 1-12.2018 | 9:00-18:00 | ALL |
| C003 | COMPANY X | SHOES | ALL | ALL | SALES | | 1-12.2018 | 9:00-18:00 | ALL |
| C004 | COMPANY Y | COSMETICS | FEMALE | 20~30 | ALL | | 4-6.2018 | 13:00-17:00 | ALL |
| C005 | COMPANY Y | COSMETICS | FEMALE | 40~50 | ALL | | 7-9.2018 | 9:00-18:00 | ALL |
| C006 | COMPANY Z | EATING AND DRINKING | ALL | 30~60 | ALL | | 3-5.2018 | 12:00-18:00 | TOKYO, KANAGAWA |

Fig. 3(B)

(B) CONTENT STORED LOCATION TABLE

| URLID | CONTENT STORED LOCATION | TARGET ATTRIBUTE | | | DISTRIBUTION CONTENT ID |
| --- | --- | --- | --- | --- | --- |
| | | GENDER | AGE | OCCUPATION | |
| U001 | https://www.○○○ | MALE | 20~40 | ENGINEER | C001 |
| U002 | https://www.×××  | ALL | ALL | SALES | C002,C003,C004,C005,C006 |
| U003 | https://www.■■■ | FEMALE | 20~30 | ALL | C004 |
| U004 | https://www.▲▲▲ | ALL | 30~50 | ALL | C002,C003,C006 |
| U005 | https://www.●●● | FEMALE | 30~40 | OFFICE WORK | C006 |

Fig. 3(C)

(C) CONTENT PATH TABLE

| DISTRIBUTION CONTENT ID | SAVED LOCATION PATH |
|---|---|
| C001 | aaa/bbb/c001 |
| C002 | aaa/bbb/c002 |
| C003 | aaa/bbb/c003 |
| C004 | aaa/bbb/c004 |
| C005 | aaa/bbb/c005 |
| C006 | aaa/bbb/c006 |

Fig. 3(D)

(D) DISTRIBUTION RESULT TABLE

| DISTRIBUTION CONTENT ID | CLIENT TERMINAL ID | DISTRIBUTION RESULT (SECONDS) | | | NUMBER OF DISTRIBUTIONS (TIMES) |
|---|---|---|---|---|---|
| | | OCTOBER 1ST | OCTOBER 2ND | OCTOBER 31ST | |
| C001 | R001 | 3600 | 3000 | 1000 | 20153 |
| C001 | R00X | 5000 | 6000 | 2000 | 1250 |
| C002 | R003 | 1500 | 550 | 2000 | 1234 |
| C002 | R005 | 300 | 100 | 1000 | 5987 |
| C003 | R003 | 900 | 800 | 850 | 1525 |
| C003 | R005 | 2800 | 3200 | 1700 | 15456 |
| C004 | R004 | 6400 | 4600 | 5600 | 8752 |
| C005 | R004 | 7800 | 3400 | 6400 | 8787 |
| C006 | R003 | 3800 | 4000 | 5200 | 3395 |
| C006 | R005 | 2100 | 1800 | 3200 | 9512 |
| C006 | R00X | 900 | 5000 | 2900 | 18410 |

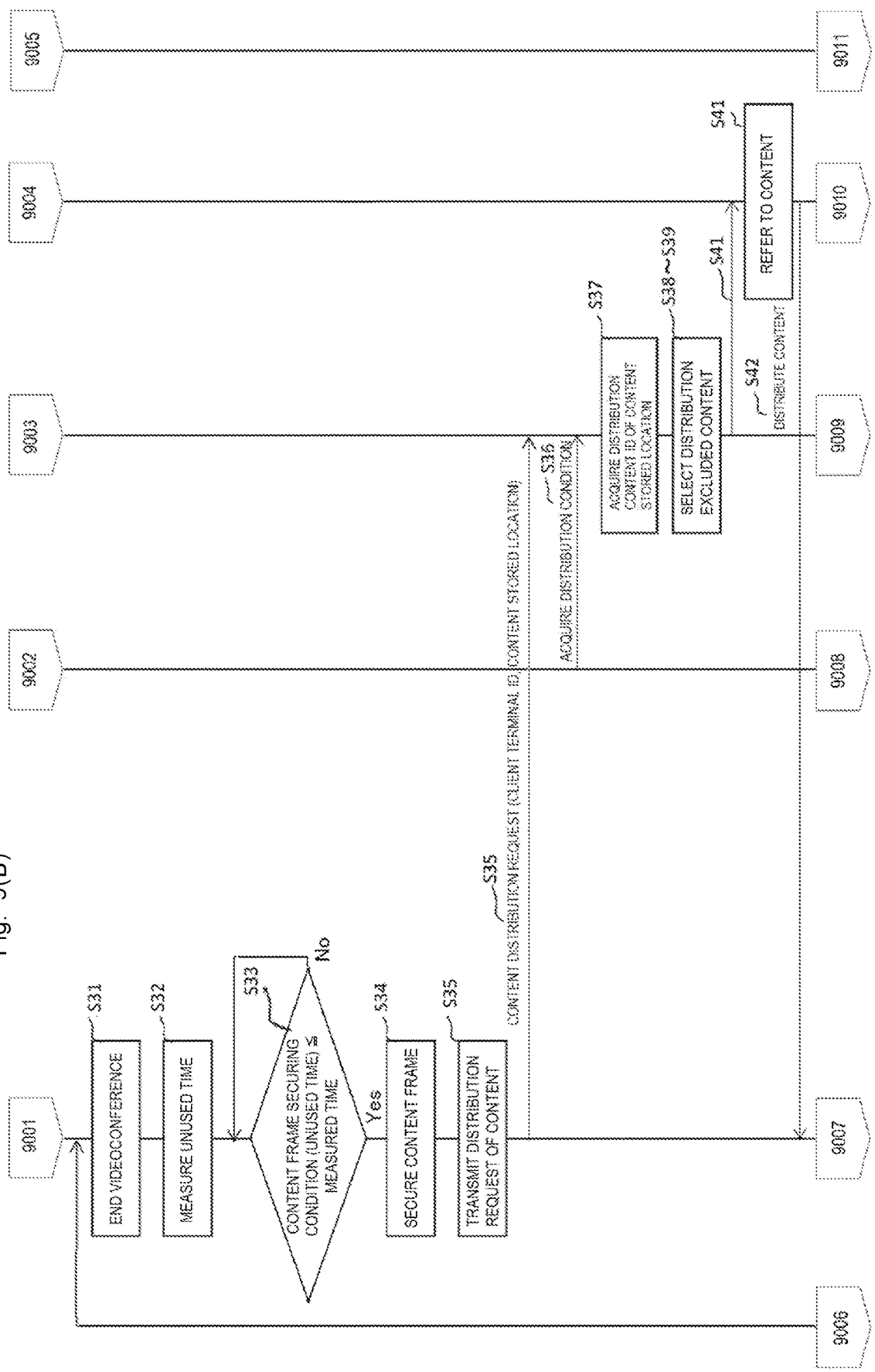

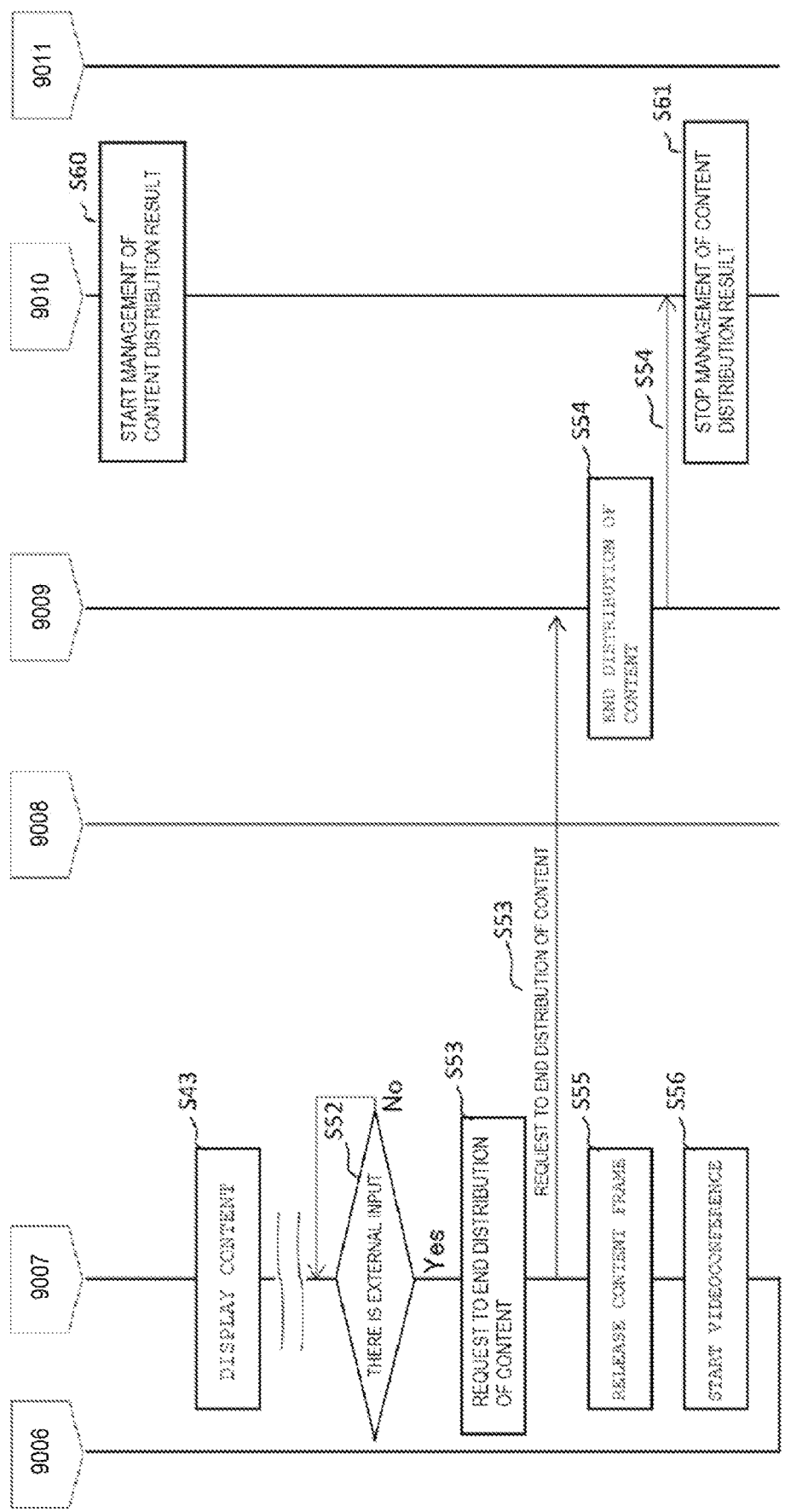

CONTENT PROVIDING SYSTEM, CONTENT PROVIDING METHOD, AND CONTENT PROVIDING PROGRAM

CROSS REFERENCE TO RELATED APPLICATIONS

This application is a U.S. National Phase Application under 35 U.S.C. 371 of International Application No. PCT/JP2019/003905, filed on Feb. 4, 2019. The entire disclosure of the above application is expressly incorporated by reference herein.

BACKGROUND

Technical Field

The present invention, in regards to a communication system capable of having two-way communication such as a videoconference, relates to a content providing system, a content providing method, and a content providing program with which a client terminal having a display unit secures a content frame for displaying content including an advertisement or the like, requests distribution of the content, and receives the content that suits the viewers.

Related Art

Recently, with the spread of digital signage, monitors and apparatuses for digital signage are also placed at companies, pubic organizations, shops, schools, and the like for transmitting information. Furthermore, it is becoming common to call the signage that is designed to provide customer information at a reception and the like at an entrance of a building, the signage designed to share the message from the management and information of new products within a company, and the signage designed to call for improving operation efficiency and cost reduction as office signage.

In the meantime, in business scenes, communication not only through telephones and e-mails but through face-to-face communication such as a videoconference often becomes necessary. While such conference equipment is generally placed at a conference room, such equipment depending on its purpose of use is also placed in an open space such as a lounge or a free space where a large number of people come and go. However, while a monitor of conference equipment displays materials to be shared with members of the other party on the line during a conference, it is not used in other times than the conferences (power is OFF, blackout, or the like) or just used to repeatedly display a simple video such as a screen saver, so that such a monitor cannot be used effectively in other times than the conferences. Furthermore, even in a case where information is constantly displayed during business hours, office signage is simply used to display information within a company such as notification of events, goals for achieving operation efficiency and cost reduction, internal communication matters such as instructions from supervisors and the like, but not used to display advertisements for commercial purposes. For displaying such advertisements, digital signage equipment for advertisements is separately placed for such cases.

Japanese Patent No. 5188865 discloses a method that stores in advance an advertisement output condition as a condition for outputting an advertisement on a videoconference system and, when the advertisement output condition (a predetermined number of videoconference terminal devices are in an uncommunicable state, the current time is before the start time that is included in conference information, or the like) is satisfied, displays an advertisement targeted for owners of the terminals by reflecting content and the like of the conference on videoconference terminals.

Japanese Patent No. 5650615 discloses an invention of a broadcast planning method that generates in advance a time schedule for providing content, secures an optimal schedule by considering broadcast conditions of each content in regards to a large number of pieces of content including content of different characteristics regarding the broadcast plan for broadcasting the content, and provides the content according to the time schedule. Furthermore, also disclosed is that content posting information includes a place attribute and an attribute that designates the place where the content can be broadcasted, and that it is possible to specify to broadcast information regarding pharmaceuticals and health promotion only on a display within a hospital, or to broadcast information limited within a company only on a display within an office where no outsiders can enter, for example.

However, Japanese Patent No. 5188865 does not disclose: a configuration that outputs an advertisement directed for a large number of specific viewers that fit the needs of an advertiser by matching targets desired by the advertiser with a large number of specific viewers in a place where a videoconference terminal device outputting an advertisement is placed before outputting the advertisement. Furthermore, Japanese Patent No. 5650615 does not disclose a configuration that includes a videoconference terminal device even though it unilaterally distributes content such as an advertisement on a display terminal based on a broadcast schedule defined in advance by a server, and does not disclose a configuration in which the videoconference terminal device side secures a content frame (time frame for displaying the content) for displaying the content not by a schedule defined in advance but based on own use state, either.

Therefore, the present invention provides, in regards to a communication system capable of two-way communication using videos such as a videoconference or the like, a content providing system capable of allowing a client terminal side to secure a content frame (time frame for displaying content) for displaying content based on use state of the client terminal itself and displaying the content toward a large number of specific viewers that fit the needs of the content owner.

SUMMARY

The content providing system according to the present invention includes a client terminal and a server, and provides content based on a use state of the client terminal, in which: the client terminal includes a client control unit that secures a content frame for providing the content, and a display unit; the server includes a client terminal management unit that manages terminal information of the client terminal, a content recording unit that saves the content, a content management unit that manages content information of the content, a content distribution control unit that performs distribution control of the content, and a distribution condition management unit that generates a distribution condition based on the terminal information of the client terminal and the content information of the content, and notifies the distribution condition to the client control unit; the client control unit secures the content frame based on the distribution condition notified from the distribution condition management unit, and transmits a distribution request of the content to the content distribution control unit; the content distribution control unit extracts and distributes the content from the content recording unit; and the client control unit displays the content distributed by the content distribution control unit on the display unit within the content frame.

The terminal information of the client terminal of the content providing system according to the present invention includes a viewer attribute and a content frame securing condition.

The content information of the content of the content providing system according to the present invention includes a target attribute.

The distribution condition management unit of the content providing system according the present invention manages the content information having the target attribute of the content information matching the viewer attribute of the terminal information, generates and notifies, to the client control unit, the distribution condition including the content frame securing condition of the terminal information.

The client control unit of the content providing system according to the present invention manages the use state of the client terminal, secures the content frame when the use state of the client terminals satisfies a condition in the content frame securing condition, and transmits the distribution request of the content to the content distribution control unit.

The distribution condition management unit of the content providing system according to the present invention includes, as the distribution condition, distribution permission information included further in the terminal information, and the client control unit determines whether or not to secure the content frame based on the distribution permission information included in the distribution condition.

The content providing system according to the present invention further includes a content distribution result management unit that manages a distribution result of the content.

The client terminal of the content providing system according to the present invention further includes an input unit, and the client terminal is capable of having two-way communication with one or more other client terminals by inputting connection destination information for connecting with the one or more client terminals from the input unit.

The content of the content providing system according to the present invention includes the connection destination information, and the two-way communication with the one or more client terminals is made possible by receiving input of the connection destination information made in the content displayed on the display unit from the input unit.

The client terminal of the content providing system according to the present invention further includes an image-capturing unit and an acoustic unit, the display unit is installed in an open space where there is no limit in the number of viewers, and a videoconference is possible to be held with one or more other client terminals.

The content providing method according to the present invention is a content providing method for providing content based on a use state of a client terminal, the content providing method including steps of: securing a content frame for providing the content; managing terminal information of the client terminal and saving the content; managing content information of the content and performing distribution control of the content; generating a distribution condition based on the terminal information of the client terminal and the content information of the content, and notifying the distribution condition to the client terminal; securing the content frame based on the notified distribution condition, and transmitting a distribution request of the content; extracting and distributing the saved content; and displaying the distributed content within the content frame.

The content providing program according to the present invention is a content providing program for providing content based on a use state of a client terminal, the content providing program causing the client terminal to execute: a function of securing a content frame for providing the content to the client terminal; a function of managing terminal information of the client terminal, saving the content, managing content information of the content, performing distribution control of the content, generating a distribution condition based on the terminal information of the client terminal and the content information of the content, and notifying the distribution condition to the client terminal; a function of securing the content frame based on the notified distribution condition, and transmitting a distribution request of the content; a function of extracting and distributing the saved content; and a function of displaying the distributed content within the content frame.

Advantageous Effects of Invention

As described above, according to the present invention, it is possible to distribute the content (advertisement or the like) toward a large number of specific viewers that fit the needs of the content owner (advertiser or the like) by matching the attribute (gender, age, occupation, and the like) of the viewers near the place where the client terminal is installed with the attribute (gender, age, occupation, and the like) of the target for which the content owner (advertiser) desires to distribute the content.

Furthermore, according to the present invention, when the use state of the client terminals satisfies "content frame securing condition", the client control unit of the client terminal secures the content frame (time frame for displaying the content) for displaying the content such as an advertisement on the display unit and transmits a distribution request of the content. Therefore, the content is not distributed unilaterally from the server or the like but can be distributed and received by the control of the client terminal side, so that the time where the client terminal is not used can be effectively utilized.

Furthermore, according to the present invention, the client terminals installed at various places secure the content frame (time frame for displaying the content) based on the respective use states and transmit distribution requests that suit "installation place" of the client terminals, so that it is possible to display different optimal content at different arbitrary timings for each of the client terminals.

Furthermore, according to the present invention, by designating "distribution permittance" of the content as the terminal information for each of the client terminals, it is possible not to display the content according to the intention of the provider of "installation place" of the client terminal, depending on "installation place" and "viewer attribute" of the client terminal.

Furthermore, according to the present invention, by designating the information of "content type" or "excluded content owner" as "distribution excluded content" for each of the client terminals, it is possible not to display content of a specific type not useful to the viewer or the content of a specific content owner such as a competitor or the like so as to keep it out of the eyes of the viewer according to the intention of the provider of "installation place" of the client terminal.

Furthermore, according to the present invention, by designating "distribution period" or "distribution time" of the content by each content, it is possible to display the content in the period or the time zone intended by the content owner so that the appealing power of the content can be increased.

Furthermore, according to the present invention, by managing and matching "region" where the client terminals are installed with the information of "region" to which the content is to be distributed, it is possible to display the content for the target living, working, or staying in "region" intended by the content owner so that the appealing power of the content can be increased.

Furthermore, according to the present invention, by managing "distribution result (the number of distributions, distribution date/time, distribution time, and the like) by each content, it is possible to feed back the managed "distribution result (the number of distributions, distribution date/time, distribution time, and the like) to the content owner, use it for marketing, use it as a reference for creating new content, and use it for billing.

Furthermore, according to the present invention, by inputting the connection destination information for connecting to one or more other client terminals from the input unit of the client terminal, it is possible to have two-way video communication with one or more other client terminals. By designating the content frame securing condition, it is possible to give priority to having two-way communication such as a videoconference even when content is being displayed.

Furthermore, according to the present invention, by making it possible to have two-way communication with one or more other client terminals through having the connection destination information for connecting to one or more other client terminals in the content and receiving input in the displayed content, the viewer is not only allowed to view the content unilaterally but is also capable of directly contacting one or more other client terminals, and becomes capable of having two-way video communication such as making an inquiry to the content owner about details displayed in the content, requesting for materials, and going through a purchase procedure or the like.

Furthermore, according to the present invention, the client terminal further includes the image-capturing unit and the acoustic unit and, by including the input from the image-capturing unit and the acoustic unit in the content frame securing condition as the use state of the client terminal, it becomes possible to provide the content by securing the content frame at an arbitrary timing according to various conditions such as the input state and the surrounding environmental state of the user (viewer) of the client terminal.

Furthermore, according to the present invention, by installing the display unit of the client terminal in an open space where there is no limit in the number of viewers, it becomes possible to allow a large number of specific viewers near the installation place of the display unit to freely view the content.

BRIEF DESCRIPTION OF THE DRAWINGS

FIGS. 2(A) and 2(B) are data configuration diagrams related to setting of a client terminal according to the present invention, in which FIG. 2(A) is a data configuration diagram of a terminal information table for managing client terminals, and FIG. 2(B) is a data configuration diagram of a master table.

FIGS. 3(A)-3(D) are data configuration diagrams for managing content according to the present invention, in which FIG. 3(A) is a data configuration diagram of a content information table for each content, FIG. 3(B) is a data configuration diagram of a content stored location table for managing content stored locations, FIG. 3(C) is a data configuration diagram of a content path table for managing paths where each content is saved, and FIG. 3(D) is a data configuration diagram of a distribution result table for managing distributed results of contents.

FIGS. 9(A)-9(C) illustrate a sequence chart of the processing according to the present invention.

DETAILED DESCRIPTION

First Embodiment

Best modes for embodying a content providing system according to the present invention will be described with reference to the accompanying drawings.

Figure 1:
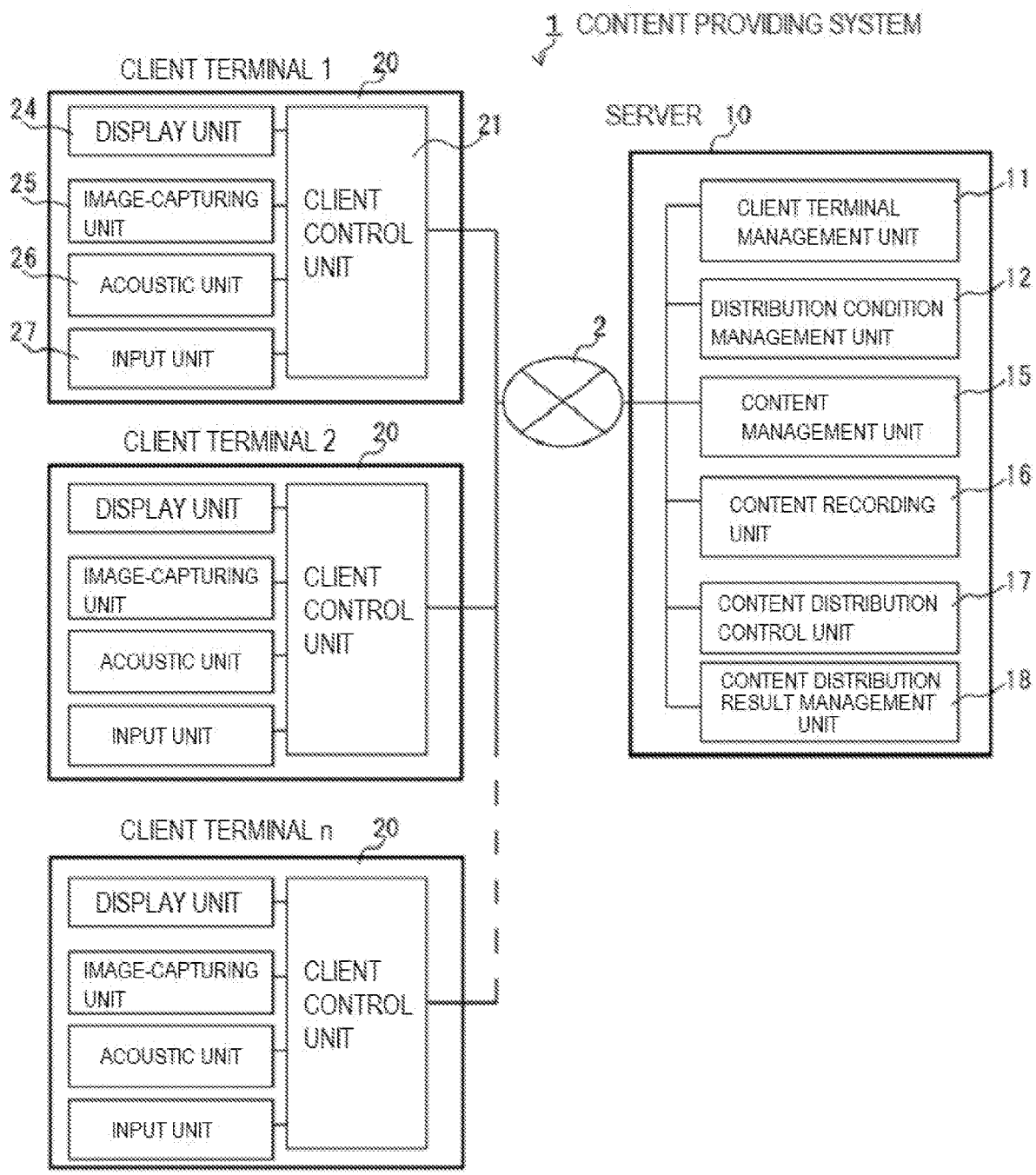
FIG. 1 is a block diagram illustrating an overall configuration according to the present invention.
Figure 4:
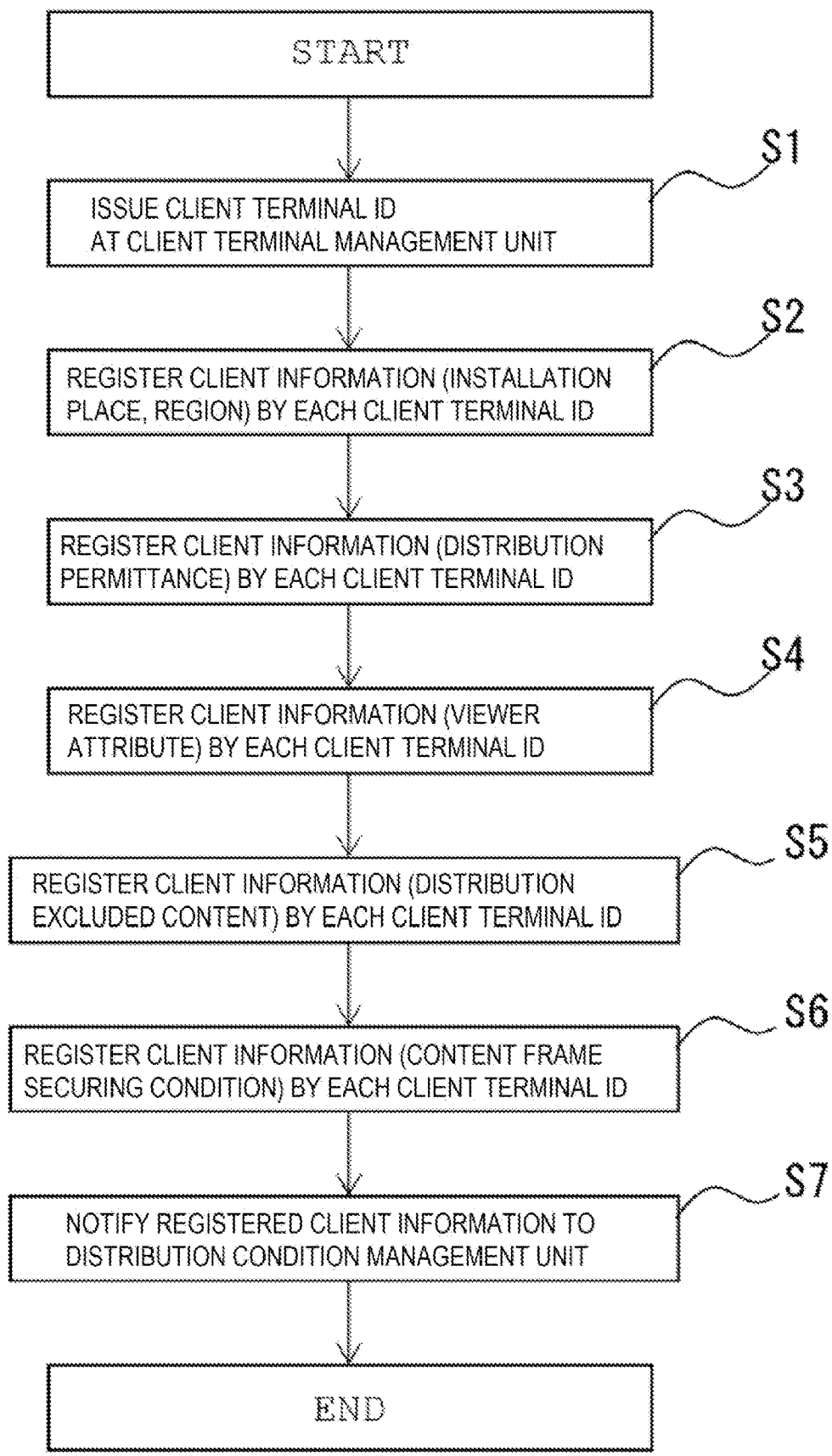
FIG. 4 is a flowchart of processing for registering terminal information of a client terminal according to the present invention.
Figure 5:
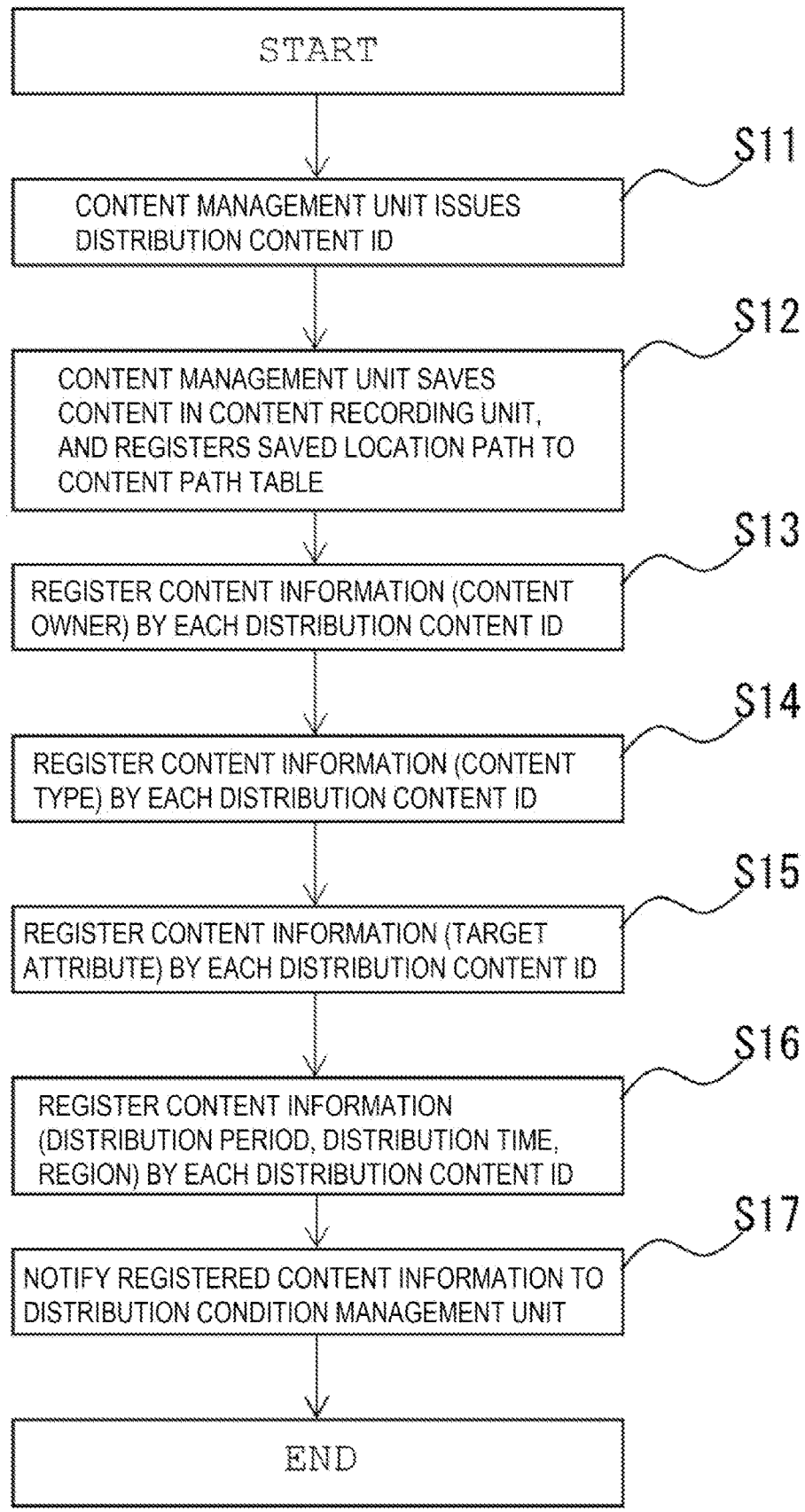
FIG. 5 is a flowchart of processing for registering content information of content according to the present invention.
Figure 6:
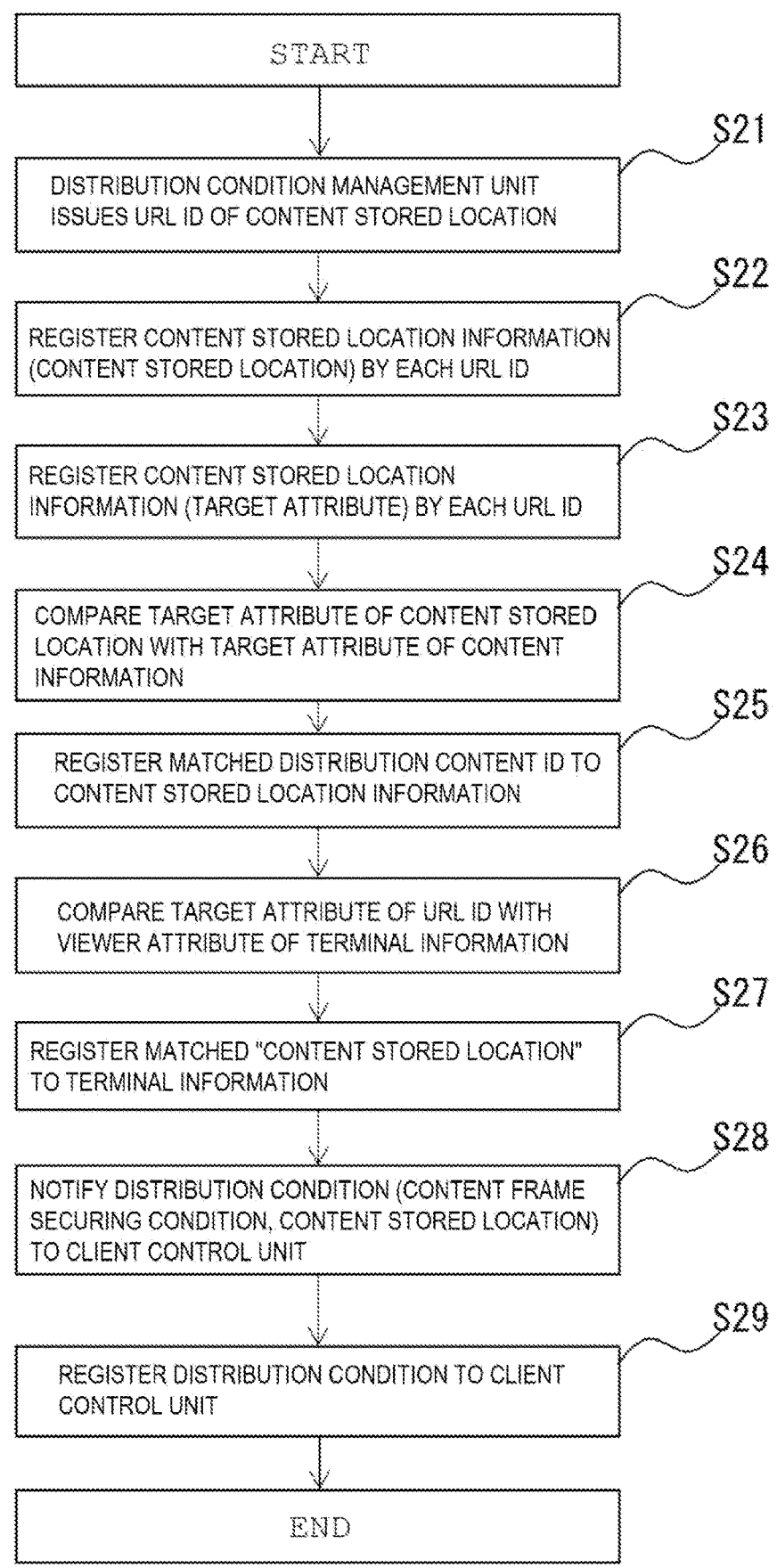
FIG. 6 is a flowchart of processing for generating a distribution condition according to the present invention.
Figure 7A:
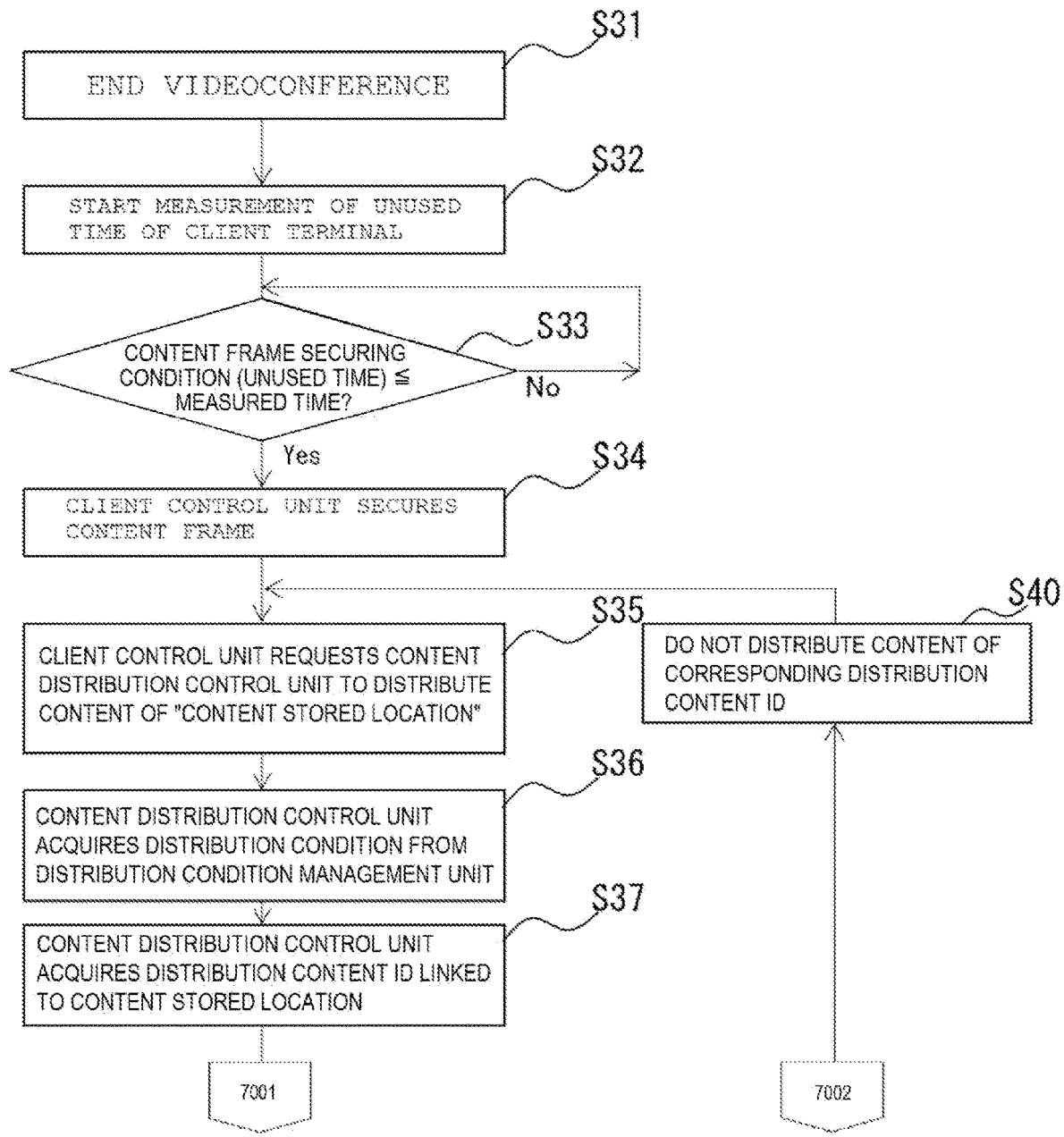
FIGS. 7(A) and 7(B) illustrate a flowchart of processing according to the present invention for distributing and displaying a content after a videoconference ends.
Figure 7B:
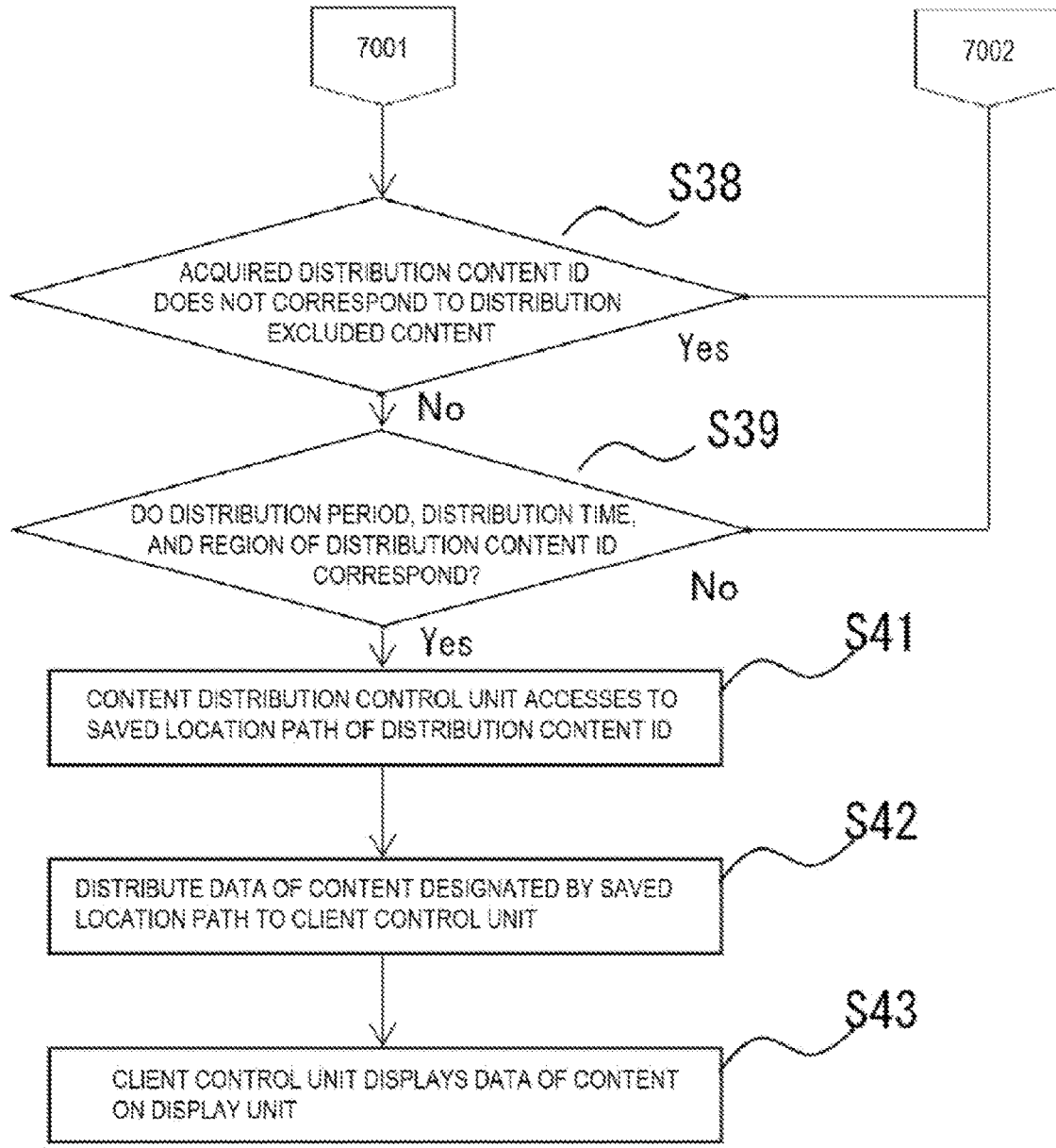
Figure 8:
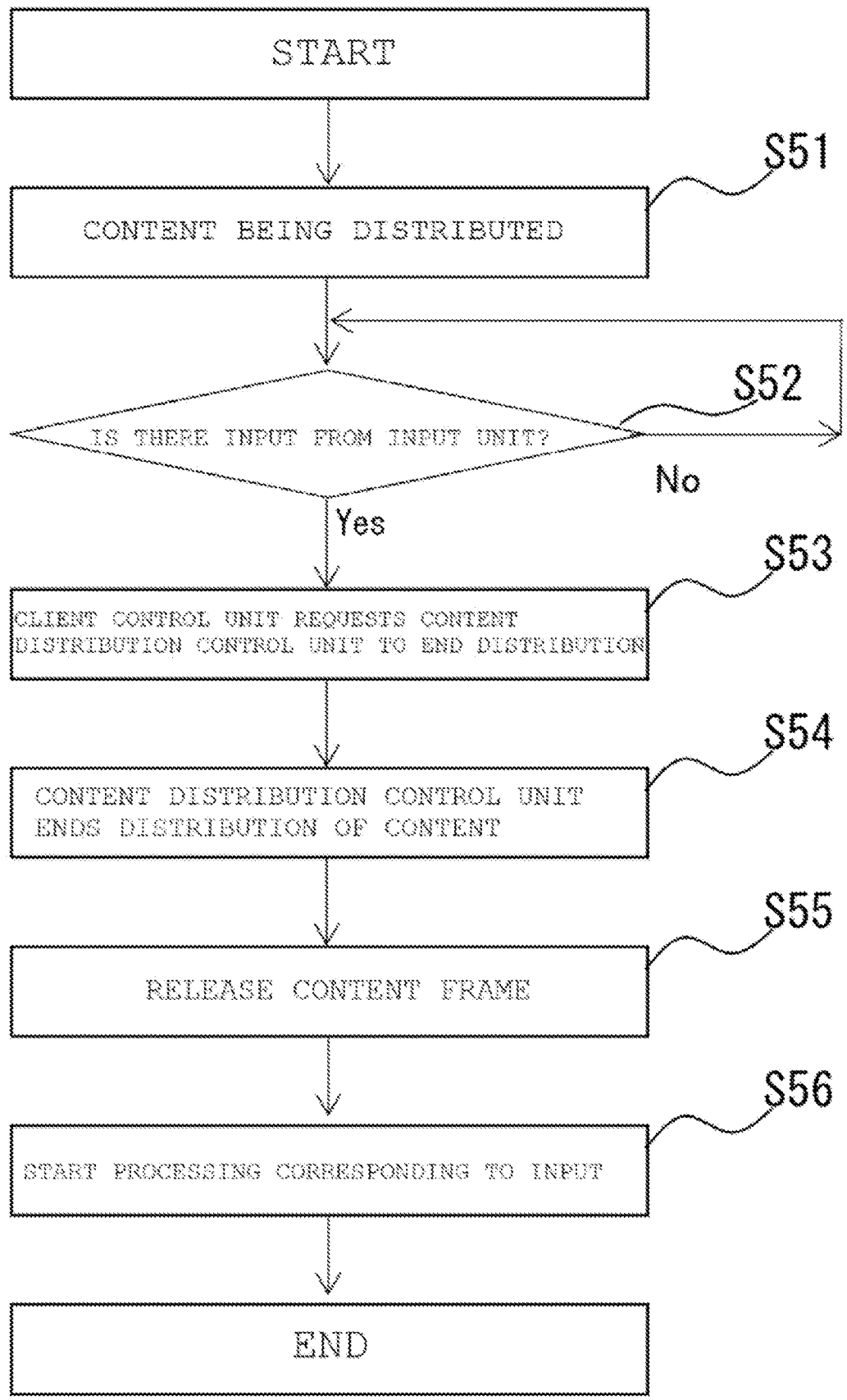
FIG. 8 is a flowchart of processing related to ending content distribution according to the present invention.

FIG. 1 is a block diagram illustrating an overall configuration according to the present invention.

As illustrated in FIG. 1, a content providing system 1 includes a server 10 and client terminals 20. The server 10 includes a client terminal management unit 11 and a distribution condition management unit 12. The client terminal 11 registers and manages the client terminals 20 by applying "client terminal ID" for identification thereto, while the distribution condition management unit 12 generates distribution conditions that suit the client terminals 20, and notifies the conditions to a client control unit 21.

Furthermore, the server 10 includes a content management unit 15, a content recording unit 16, a content distribution control unit 17, and a content distribution result management unit 18 for managing content. The content management unit 15 registers the content by applying "distribution content ID" for identification thereto, and registers/manages information of each content. The content recording unit 16 saves data of the content. According to a distribution request of content from the client control unit 21, the content distribution control unit 17 extracts the corresponding content from the content recording unit 16 and distributes it to the client terminal 20. The content distribution result management unit 18 manages "number of distributions", "distribution date/time", and the like of the content distributed to the client terminal 20.

Each of the units will be described in detail. The client terminal management unit 11 issues a client terminal ID for each of the client terminals 20, and manages the client terminals 20 with a terminal information table illustrated in FIG. 2(A).

Setting related to the terminal information is saved in the terminal information table illustrated in FIG. 2(A). The terminal information table is for managing the information regarding the client terminals 20 by linking it to "client terminal ID".

Hereinafter, items of the terminal information table illustrated in FIG. 2(A) will be described. Note that "region" is selected and set from a master table illustrated in FIG. 2(B), and the installation place of a display unit 24 of the client terminal 20 is input to "installation place". Note that "installation place" is a place where content is displayed on the display unit 24 to be viewed by viewers. An area such as nationwide, a local area, or prefectural area is set in "region", and information capable of specifying a place where the client installation 20 is installed, such as an organization name, a building name, floor, location, or the like of the building, is registered to "installation place".

For "distribution permittance", it is set whether or not to permit distribution of content to the client terminal 20. For example, in a case where content is allowed to be displayed on the client terminal 20, "permitted (Yes)" is set for "distribution permittance". In a case where the client terminal 20 is installed at a place where it is not desirable to display the content, for example, "unpermitted (No)" is set for "distribution permittance".

Note that "viewer attribute" is an item for classifying the main viewers corresponding to the client terminal 20. From the master table illustrated in FIG. 2, "gender", "age", "occupation", and the like are selected and set. As for the setting items, the items of the master table may be changed as appropriate, and there is no limit set for the setting method and content of the items. The "viewer attribute" becomes a factor for determining which content to distribute for each of the client terminals 20 by comparing it with "targe attribute" of the content information.

Note that "distribution excluded content" is set in a case where distribution of content to the client terminal 20 is allowed but distribution of a specific type of content is not allowed. Note that "content type" and "excluded content owner" are linked to "content type" and "content owner" illustrated in FIG. 3(A), respectively. By setting "distribution excluded content", it becomes possible to avoid inconveniences when distributing content, such as distributing content not appropriate for the installation place or the viewers of the client terminal 20, distributing content of competitors, and the like to the client terminal 20, for example.

Note that "content frame securing condition" is a condition for securing a content frame (time frame for displaying content) for displaying content such as an advertisement on the display unit, and can be designated by presence of or a combination of detectable input made from each of the client control unit 21, an input unit 27, an acoustic unit 26, and an image-capturing unit 25 of the client terminal 20.

For example, presence of detectable input from the client control unit 21, the input unit 27, the acoustic unit 26, and the image-capturing unit 25 may be as follows, and combinations of those are also possible.

Whether or not there is execution of software operating on the client control unit 21 (example: videoconference).
Input from the input unit 27 is not detected for a specific time (example: 300 seconds).
Specific input (example: 5-point touch, swipe operation) from the input unit 27 is detected.
Voice input from the acoustic unit 26 is not detected for a specific time (example: 600 seconds).
Specific voice (example: voice recognition, voiceprint recognition) from the acoustic unit 26 is detected.
Video input from the image-capturing unit 25 is not detected for a specific time (example: face recognition).
Specific video (example, face recognition, object/code recognition) from the image-capturing unit 25 is detected.

Furthermore, while explanation thereof is omitted in the embodiment, the client control unit 21 may include a detection unit that detects mobile terminals or the like for making it possible to detect approach or the like of a specific mobile terminal, and whether or not there is detection of such mobile terminals or the like may be used as one of "content frame securing condition".

Thereby, it becomes possible to secure a content frame at an arbitrary timing according to various states such as an input state and a surrounding environmental state of the user (viewer) of the client terminal 20, and to provide the content.

Any conditions can be set as long as those are conditions for securing the content frame. However, the first embodiment will be described by using a case where no input from the input unit 27 is detected for a specific time after a videoconference is finished.

As for "content stored location", "content stored location" to be distributed to the client terminal 20 is set by referring to a content stored location table illustrated in FIG. 3(B). At this time, for registration of "content stored location", it is possible to select one from a list based on the content stored location table or to input characters anew. The client control unit 21 designates "content stored location" when transmitting a distribution request of content to the content distribution control unit 17, so that the content linked to the "content stored location" is distributed to the client terminal 20.

The content management unit 15 registers and manages content information. The content management unit 15 has a function of allowing a system administrator to register and manage the content (advertisement, news, or the like) by giving "distribution content ID" and "target attribute" to the content.

Hereinafter, items of the content information table illustrated in FIG. 3(A) will be described. The "distribution content ID" is given to each content. For "content owner", the name of company or the like providing the content is registered. Note that "content type" and "target attribute" are for classifying the details of the content and linking what kind of viewers are to be the viewing target, and selections are made from the contents same as those of the master table illustrated in FIG. 2(B) and registered thereto. The period and time for distributing the content are set in "distribution period" and "distribution time", respectively. In "region", the area to be the distribution destination such as nationwide, a local area, a prefectural area, or the like is set as the region desired to distribute the content.

As a first function, the distribution management unit 12 has a function of generating the content stored location table illustrated in FIG. 3(B) by referring to the content information table illustrated in FIG. 3(A). The "target attribute" included in the content information and the "target attribute" set for each "URL ID" are compared, and matched "distribution content ID" is registered for each "URL ID".

Hereinafter, items of the content stored location table illustrated in FIG. 3(B) will be described.

Note that "URL ID" is for giving an ID to content stored location information for identification.

In "content stored location", the stored location of the content is registered, and it is configured with a character string indicating "content stored location" to which the client control unit 21 access via a communication network 2. While a form of "http://www. . . . " is employed in the present invention, other forms may be employed as well.

Note that "target attribute" is for linking what kind of viewer is to be the viewing target for each of the content stored locations, and selections are made from the contents same as those of the master table illustrated in FIG. 2(B).

In "distribution content ID", an ID for identification is registered by corresponding to "distribution content ID" of the content information table illustrated in FIG. 3(A). Specifically, by matching the "target attribute" of the "distribution content ID" corresponding to FIG. 3(A) with the "target attribute" in itself (the content stored location table), the corresponding "distribution content ID" of the content information table illustrated in FIG. 3(A) is registered to the content stored location table illustrated in FIG. 3(B). In a case where there are a plurality of pieces of matched content information, a plurality of distribution content IDs are registered and a plurality of pieces of content are transmitted in one distribution. Thereby, the viewers can view a plurality of pieces of content related to the viewer attribute.

For example, "gender, age, occupation" under "target attribute" in U004 of "URL ID" in the content stored location table illustrated in FIG. 3(B) are "ALL, 30 to 50, ALL", while "gender, age, occupation" under "target attribute" in C002 are "ALL, ALL, sales", in C003 are "ALL, ALL, sales, and in C006 are "ALL, 30 to 60, ALL" in the content information table illustrated in FIG. 3(A). All of those as a result of comparison are found to match "target attribute" in U004 of "URL ID" and determined as the content that is appropriate for distribution. Thereby, C002, C003, and C006 are registered to "distribution content ID" in U004 of "URL ID".

As a second function, the distribution condition management unit 12 has a function of setting "content stored location" of the terminal information table illustrated in FIG. 2(A). Specifically, by matching "viewer attribute" of the terminal information table illustrated in FIG. 2(A) with "target attribute" of the content stored location table illustrated in FIG. 3(B), the corresponding "content stored location" of the content stored location table illustrated in FIG. 3(B) is registered to "content stored location" of the terminal information table illustrated in FIG. 2(A). At this time, for registration of "content stored location", it is possible to select one from a list based on the content stored location table or to input characters anew. In a case where there are a plurality of matched content stored locations, a plurality of "content stored locations" are registered. Thereby, the viewers can view a plurality of pieces of content related to "viewer attribute".

As a third function, the distribution condition management unit 12 generates a distribution condition including "content frame securing condition" and "content stored location" at an arbitrary timing and notifies it to the client control unit 21, after registration of "content stored location" to the terminal information table is finished. Note that "content frame securing condition" and "content stored location" may be separately generated as two distribution conditions, and notified to the client control unit 21 individually.

Referring to the terminal information table, for the client control unit 21 of the client terminal 20 having "client terminal ID" under which "distribution permittance" is set as "unpermitted (No)", a distribution condition with no "content frame securing condition" is notified from the distribution condition management unit 12. Thereby, the client control unit 21 does not secure a content frame, and no distribution request is transmitted. Alternatively, the client control unit 21 may manage "distribution permittance" and, when "distribution permittance" is included in the distribution condition to be notified to the client control terminal 21 from the distribution condition management unit 12 and also "distribution permittance" is "unpermitted (No), the client control unit 21 may not transmit a distribution request and may not secure a content frame.

Furthermore, as a fourth function, the distribution condition management unit 12 has a function of notifying, to the content distribution control unit 17, the distribution condition for the client terminal 20 when the content distribution control unit 17 receives a distribution request from the client control unit 21. The distribution condition at this time includes "distribution excluded content (content type, excluded content owner)" of the terminal information table illustrated in FIG. 2(A) or any of "content owner", "content type", "distribution period", "distribution time", and "region" of the content information table illustrated in FIG. 3(A).

The content recording unit 16 is a storage that saves data related to the content to be provided to the client terminals 20. As in FIG. 3(C), the saved location of each content is managed by setting "saved location path" for each "distribution content ID".

The content distribution control unit 17 receives a distribution request (access to "content stored location", information of itself such as "client terminal ID") from the client control unit 21). The content distribution control unit 17 refers to the received "content stored location" to acquire the "distribution content ID" linked to the "content stored location", accesses to "saved location path" of the "distribution content ID", and distributes the content to the client control unit 21.

The content distribution result management unit 18 manages information such as the number of distributions, distribution date/time, accumulated distribution time, and the like regarding "distribution content ID" distributed by the content distribution control unit 17. Specifically, as illustrated in the distribution result table of FIG. 3(D), accumulated distribution time of the content is measured for each client terminal and managed for each "distribution content ID". Not only the accumulated time but the number of distributions may be counted, or the date/time or time zone of distribution may be managed to be used as basic data for content evaluation and the like.

In the explanations above, the client terminal management unit 11, the distribution condition management unit 12, the content management unit 15, the content recording unit 16, the content distribution control unit 17, and the content distribution result management unit 18 are configured to be on a same server. However, the content recording unit 16, the content distribution control unit 17, and the content distribution result management unit 18 related to content may be collectively configured as a content device on a different server, for example, and there is no limit set for such configurations as long as each of the functional units can execute processing without any problems.

Next, the client terminal 20 will be described.

The client terminal 20 includes the client control unit 21 and the display unit 24. The client control unit 21 is configured with an operating system (OS) and manages the use state of the client terminal 20. When the use state of the client terminal 20 satisfies the content frame securing condition, the client control unit 21 secures a content frame, and controls a distribution request of content for the content distribution control unit 17 and display of the content on the display unit 24. The display unit 24 is configured with a liquid crystal display, a projector, or the like, and displays the content. Furthermore, for a case of having a videoconference or the like with the client terminal 20, also provided are the image-capturing unit 25, the acoustic unit 26, and the input unit 27. The image-capturing unit 25 is configured with a video camera or a camera that captures still images, the acoustic unit 26 is configured with a microphone for collecting voice and a speaker or the like for outputting the voice, and the input unit 27 is configured with a touch panel, a keyboard, a mouse, and the like as an input device.

The client control unit 21 has following functions.

As a first function, provided is a function of receiving the distribution condition from the distribution condition management unit 12. While at least "content frame securing condition" may be included the distribution condition, "content stored location" is also included in the first embodiment.

As a second function, provided is a function of acquiring content by transmitting a distribution request to the content distribution control unit 17. While at least the information for specifying the client terminal 20 such as "client terminal ID" may be included in the distribution request, "content stored location" in addition to "client terminal ID" is also included in the first embodiment.

As a third function, provided is a function of managing the use state of the client terminal 20 and determining whether or not the use state of the client terminal 20 satisfies the "content frame securing condition" included in the distribution condition received from the distribution condition management unit 12. In a case where the "content frame securing condition" is set as "execution of videoconference system is finished", "input from the input unit 27 is not detected for a specific time (example: 300 seconds)" and it is determined that the client terminal 20 is in an unused state after a meeting such as the videoconference or the like is finished, the unused time is measured and compared with the "content frame securing condition" included in the distribution condition. Furthermore, in a case where the "content frame securing condition" is set as "specific input (example: 5-point touch, swipe operation) from the input unit 27 is detected), it is determined whether or not the viewer made an input for securing a content frame regardless of the use state of the client terminal 20 for a meeting such as a videoconference.

As a fourth function, provided is a function of managing input signals from the input unit 27, processing of videos captured by the image-capturing unit 25, input/output processing for the acoustic unit 26, and output of the videos to the display unit 24.

Furthermore, as a fifth function, provided is a function of securing and releasing a content frame based on whether or not the use state of the client terminal 20 satisfies the "content frame securing condition". When determined that the use state of the client terminal 20 satisfies the "content frame securing condition" included in the distribution condition received from the distribution condition management unit 12, a content frame for displaying content is secured. The distributed content is displayed within the secured content frame. Furthermore, when the content distribution control unit 17 ends delivery of the content upon receiving a request to end distribution from the client control unit 21, the content frame is released.

The "use state of the client terminal 20" means presence of input from each of the client control unit 21, the input unit 27, the acoustic unit 26, and the image-capturing unit 25 and combinations thereof, and indicates the following states, for example.

Whether or not there is execution of software operating on the client control unit 21 (example: videoconference).

Input from the input unit 27 is not detected for a specific time (example: 300 seconds).

Specific input (example: 5-point touch, swipe operation) from the input unit 27 is detected.

Voice input from the acoustic unit 26 is not detected for a specific time (example: 600 seconds).

Specific voice (example: voice recognition, voiceprint recognition) from the acoustic unit 26 is detected.

Video input from the image-capturing unit 25 is not detected for a specific time (example: face recognition).

Specific video (example, face recognition, object/code recognition) from the image-capturing unit 25 is detected More specific examples are the states as follows.

State where a meeting such as a videoconference is finished, and unused time of the client terminal 20 (state where there is no input from any of the input unit 27, the acoustic unit 26, and the image-capturing unit 25) has continued for a specific time (time defined in "content frame securing condition").

State where a specific input (command input via a touch panel, a keyboard, or the like, operation of buttons, or the like) for requesting content distribution is made on the input unit 27 during or after a videoconference.

State where a specific sound (voice of the viewer, voice command reading, footsteps, music, or the like) for requesting content distribution is collected by the acoustic unit 26 during or after a videoconference.

State where there is input from the image-capturing unit 25 (a simple video, a video of a specific posture, a video of a specific person or object, or the like) during or after a videoconference.

Furthermore, while there is no explanation provided in the embodiment, the client control unit 21 may include a detection unit that detects mobile terminals or the like for making it possible to detect approach or the like of a specific mobile terminal, and whether or not there is detection of such mobile terminals or the like may be used as the use state of the client terminal 20.

Thereby, it becomes possible to secure a content frame at an arbitrary timing according to various states such as an input state and a surrounding environmental state of the user (viewer) of the client terminal 20, and to provide the content.

Next, the content frame will be described. The content frame according to the present invention means a time frame for distributing content. By securing a time frame for distributing content as the content frame when the use state of the client terminal 20 satisfies the condition in "content frame securing condition", content is provided within the content frame. Then, when delivery of the content (distribution time) is ended, the content frame is released. The content frame may be released on condition that there is arbitrary input from the input unit 27, the acoustic unit 26, or the image-capturing unit 25 of the client terminal 20 different from the "content frame securing condition", on condition that the client terminal 20 is used for a different usage (for example, starting a videoconference) from delivery of the content, or the like.

As described, the present invention is configured not to distribute the content scheduled in advance from the server 10 unilaterally but to "secure the content frame when the use state of the client terminal 20 satisfies the condition in the condition frame securing condition", so that it is possible to call (provide) the content at an arbitrary timing.

The display unit 24 is configured with a liquid crystal display, a projector screen, or the like, and displays a video such as a moving image, a still image, and a WEB screen. Furthermore, there may be a single screen or a plurality of pieces of liquid crystal displays, projector screens, or the like. Furthermore, there is no specific limit set for the size of the display screens.

Furthermore, with the present invention, it is desirable to place the display unit 24 not in a closed place where entering/leaving of the viewers is limited but in an open space where there is no limit set for entering/leaving of the viewers. By placing the display unit 24 in an open space such as a corner of an office without walls, or at an entrance of an office, for example, employees working in the office can view the content while working, in breaktime, when passing by, or the like.

The image-capturing unit 25 is configured with a video camera, a still camera, a WEB camera, or the like, and it is a camera that captures the state in the vicinity of the client terminal 20. When holding a videoconference, viewers participating in the conference are captured. With a wide-angle camera, viewers in a wide range can be captured at once. Furthermore, it is also possible to have a function capable of recognizing the gender, age, the number, moving direction, details of action, stay time, and the like of the captured viewers. In a case where "content frame securing condition" is specific input from the image-capturing unit 25, the client control unit 21 secures a content frame based on the input from the image-capturing unit 25.

The acoustic unit 26 is configured with a microphone that collects the voice and the like in the vicinity of the client terminal 20, and a speaker that outputs the voice, music, and the like. In a case of a videoconference, the voice of the viewers participating in the conference is input, and the voice is output from the speaker of the other party. In a case where the "content frame securing condition" is specific input from the acoustic unit 26, the client control unit 21 secures a content frame based on the input from the acoustic unit 26. Furthermore, when the display unit 24 is displaying the content, the voice, music, and the like related to the content may be output.

The input unit 27 is a device that includes a touch panel, a stylus pen, a keyboard, a mouse, or the like for making input for the client terminal 20. It is desirable to have a proper device depending on the installation place of the client terminal 20, input frequency, and the viewers. For example, when the display unit 24 has a touch panel mode, it is desirable for the front face of the display unit 24 to have a touch panel for input. In a case where the "content frame securing condition" is specific input from the input unit 27, the client control unit 21 secures a content frame based on the input from the input unit 27.

While the configuration of providing the server 10 and the client terminal 20 separately from each other has been described above, it is also possible to employ a configuration having both functions of the server 10 and the client terminal 20, for example. Furthermore, it is also possible to employ a configuration in which the client terminal 20 has a part of the function of the server 10, or a configuration in which the server 10 has a part of the function of the client terminal 20. There is no limit set for any of such configurations as long as each of the functional units can execute the processing without any problems.

Next, processing for managing terminal information by registering it to the terminal information table illustrated in FIG. 2(A) will be described by referring to FIG. 4 and FIGS. 9(A)-9(C).

The terminal information table illustrated in FIG. 2(A) is the information regarding the client terminals 20, and registration thereof is made by the client terminal management unit 11 through step S1 to step S6 described hereinafter. First, a client terminal ID is issued (step S1).

Then, by having the client terminal ID as a key, corresponding "installation place" and "region" are registered (step S2), and "distribution permittance" for content is registered for each client terminal ID (step S3). The content is distributed in a case of "distribution: permitted (Yes)", while no content is distributed at all in a case of "distribution: unpermitted (No)".

Then, "viewer attribute" is registered for each client terminal ID (step S4). Referring to the master table, while the registered contents of "viewer attribute" are the items of "gender", "age", and "occupation", it is also possible to add and change the items of the master table as appropriate. Setting the "viewer attribute" in a detailed manner makes it possible to perform matching regarding which content is to be provided to each of the client terminals 20, so that the content that better fits the desired target of the content owner can be distributed in an efficient manner.

Then, "distribution excluded content" is registered (step S5). Note that "distribution excluded content" includes "content type" and "excluded content owner". When there is a type of content not desirable to be displayed on the client terminal 20 even though "viewer attribute" of the client terminal 20 matches "target attribute" of the content, such content is registered. Furthermore, in a case where the place where the client terminal 20 is installed is in a company, content of competitors or the like as the content owners is not supposed to be displayed. Therefore, the owner of such content not desirable to be displayed on the client terminal 20 is registered as "excluded content owner". Thereby, the content not to be distributed to the client terminal 20 is specified so that the content distribution control unit 17 does not actually distribute the content.

Then, "content frame securing condition" is registered (step S6). In the first embodiment, described is a case where "input from the input unit 27 is not detected for a specific time (300 seconds)" is defined as "content frame securing condition".

Then, after the terminal information is registered, the client terminal management unit 11 notifies the terminal information to the distribution condition management unit 12 while saving the terminal information automatically or optionally (step S7).

Next, processing for registering/managing the content information to the content information table illustrated in FIG. 3(A) will be described by referring to FIG. 5 and FIGS. 9(A)-(C).

The content information table illustrated in FIG. 3(A) is the information regarding the content information, and registered by the content management unit 15 through step S11 to step S16.

First, the content management unit 15 issues "distribution content ID" (step S11), and saves the content in the content recording unit 16 while registering "saved location path" to the content path table at the same time (step S12).

Then, for each "distribution content ID" in the content information table illustrated in FIG. 3(A), corresponding "content owner" is registered (step S13). Thereafter, "content type" of the content is registered for each "distribution content ID" (step S14). For registering "content type", the best suited name item for the contents of the content is selected by referring to the master table. It is also possible to add and change the contents of "content type" in the master table as appropriate.

Then, "target attribute" is registered for each "distribution content ID" (step S15). Referring to the master table, while the registered contents of "target attribute" are the items of "gender", "age", and "occupation", it is also possible to add and change the items of the master table as appropriate. Setting the "target attribute" in a detailed manner makes it possible to perform matching regarding which content is to be provided to each of the client terminals 20, so that the content that better fits the desired target of the content owner can be distributed in an efficient manner. Then, "distribution period", "distribution time", and "region" are registered (step S16). The distribution start date and distribution end date are set in "distribution period", and distribution time within a day is set in "distribution time". In "region", an area to be the distribution destination such as nationwide or a prefectural area is set as the region desired to distribute the content. It is possible to be set as appropriate according to the contents of the content.

Then, after the content information is registered, the content management unit 15 notifies the content information to the distribution condition management unit 12 while saving the content information automatically or optionally (step S17).

Next, processing for registering "content stored location" and "distribution content ID" linked thereto to the content stored location table illustrated in FIG. 3(B) will be described by referring to FIG. 6 and FIGS. 9(A)-(C).

The content stored location table illustrated in FIG. 3(B) is the information regarding "content stored location", and registered by the distribution condition management unit 12 through step S21 to step S27 described hereinafter.

First, the distribution condition management unit 12 issues an ID for identifying "content stored location" as "URL ID" (step S21).

The distribution condition management unit 12 registers "content stored location" (for example, URL data such as https://www.XXX or the like) as the stored location of the content for each "URL ID" issued in step S21 (step S22). Then, "target attribute" is registered (step S23). Referring to the master table, while the registered contents of "target attribute" are the items of "gender", "age", and "occupation", it is also possible to add and change the items of the master table as appropriate. Setting the "target attribute" in a detailed manner makes it possible to link the content to each of the content stored locations and perform matching of the content stored location for each of the client terminals 20, so that the content that better fits the desired target of the content owner can be distributed in an efficient manner.

Then, "target attribute" of the content information table illustrated in FIG. 3(A) set in step S15 is compared with "target attribute" of the content stored location table illustrated in FIG. 3(B) (step S24). When both "target attribute" match, the matched "distribution content ID" is registered in the content stored location table illustrated in FIG. 3(B) (step S25). In this manner, for each "URL ID", it is possible to put the matched content of "target attribute" into a group and manage.

Then, "target attribute" of the content stored location table illustrated in FIG. 3(B) is compared with "viewer attribute" of the terminal information table illustrated in FIG. 2(A) (step S26). When both "attribute" match, the matched "content stored location" is registered in the terminal information table illustrated in FIG. 2(A) (step S27). In this manner, the matched "content stored location" of "viewer attribute" is set for each "client terminal ID", thereby making it possible to link the matched content to "viewer attribute" of the client terminal 20 and manage for each of the client terminals 20. Since "viewer attribute" of the client terminal 20 matches the needs of the content owner desired as the target, the content owner can pinpoint the intended targets and have them view the content effectively.

Then, after "content stored location" is registered, the distribution condition management unit 12 notifies the distribution condition including "content frame securing condition" and "content stored location" to the client control unit 21 automatically or optionally (step S28).

The client control unit 21 registers the distribution condition notified from the distribution condition management unit 12 (step S29).

The distribution condition of the present invention will be described hereinafter. The distribution condition is the condition for distributing content, and "content frame securing condition" described above is also included in the distribution condition. Furthermore, "content stored location" is included to be set as the distribution condition in the first embodiment, and "content frame securing condition" and "content stored location" are included in the distribution condition discussed in step S29 above. Furthermore, while the distribution condition includes "distribution excluded content (content type, excluded content owner) of the terminal information table or any of "content owner", "content type", "distribution period", "distribution time", and "region" in the content information table when the fourth function of the distribution condition management unit 12 is used, "distribution excluded content (content type, excluded content owner) in the terminal information table or any of "content owner", "content type", "distribution period", "distribution time", and "region" in the content information table is acquired in step S36 to be described later. Other than those, conditions necessary for distribution may be added or replaced to be set.

Next, described by referring to FIGS. 7(A) and 7(B) and FIGS. 9(A)-(C) is processing performed when the client control unit 21 secures a content frame and displays content on the display unit 24 after communication software (referred to as software hereinafter) for using the client terminal 20 as a communication system for a videoconference or the like is terminated.

First, in the client terminal 20, software for a videoconference or the like between one or more other client terminals 20 is terminated (step S31). Upon detecting termination of the software, the client control unit 21 starts measurement of unused time of the client terminal 20 from the termination of the software for a videoconference or the like (step S32), and compares it with the unused time condition (example: 300 seconds) designated in "content frame securing condition" as the distribution condition (step S33).

In a case where "content frame securing condition (unused time)" ≤the measured time (Yes in step S33), the client control unit 21 secures a content frame for displaying content (step S34). Furthermore, distribution of content is requested to the content distribution control unit 17 by using "content stored location" received as the distribution condition as a distribution request (step S35). While "content stored location" is used as the distribution request at this time, information for specifying the client terminal 20 is transmitted along. Any information capable of specifying the client terminal 20 may be transmitted, and an example thereof may be "client terminal ID" of the terminal information table illustrated in FIG. 2(A). Furthermore, in a case where "content frame securing condition (unused time)" ≥the measured time (No in step S33), it means that "content frame securing condition" is not satisfied, so that measurement of the measured time is continued.

Upon receiving the distribution request from the client control unit 21, the content distribution control unit 17 acquires the distribution condition from the distribution management unit 12 (step S36), and acquires "distribution content ID" linked to the "content stored location" from the content stored location table by referring to "content stored location" of the terminal information table (step S37). Then, it is determined whether or not the acquired "distribution content ID" corresponds to "distribution excluded content". In a case where "content type" written in "distribution excluded content" of the terminal information table and "content type" written in the content information table are searched and found to match or in a case where "excluded content owner" written in "distribution excluded content" of the terminal information table and "content owner" written in the content information table match, the matched "distribution content ID" is specified as "distribution excluded content" (Yes in step S38), and distribution of the content is stopped (step S40).

When determined not to correspond to the distribution excluded content (No in step S38), the content distribution control unit 17 refers to "distribution period" and "distribution time" in the content information table, and determines whether or not "region" matches the "region" written in the terminal information table so as to determine whether or not "distribution content ID" corresponds to the date/time and the area desired by the content owner (step S39).

When determined to correspond (Yes in step S39), the content distribution control unit 17 refers to the content path table illustrated in FIG. 3(C) and access to "saved location oath" of "distribution content ID" saved in the content recording unit 16 (step S41). Data of the content is distributed to the client control unit 21 from the saved location registered in "saved location path" (step S42).

When determined not to correspond (No in step S39), distribution of the content is stopped (step S40), and only other corresponding content is distributed.

The client control unit 21 displays the received content on the display unit 24 (step S43). In this case, the content is displayed within the content frame.

As described, when a specific time has passed in which the client terminal 20 is not using the software for a videoconference or the like, the client control unit 21 can effectively utilize the unused time of the client terminal 20 by securing a content frame based on "content frame securing condition", transmitting a distribution request to the content distribution control unit 17, and displaying the content saved in the content recording unit 16 on the display unit 24. Furthermore, by setting "viewer attribute" for each of the client terminals 20 and "target attribute" for each content and by matching a large number of specific viewers in the place where the client terminal 20 for displaying the content is installed with the target group as the desired viewers of the content owner (advertiser) before displaying the content, it is possible to distribute the content that is appropriate for the viewer of the attribute that fits the needs of the content owner for each of the client terminals 20.

While step S31 to S35 mentioned above are described regarding a case where the unused time of the client terminal 20 is defined as "content frame securing condition", described hereinafter is a case where detection of specific input from the input unit 27 of the client terminal 20 is defined as the condition.

Regardless whether it is in the unused time after a videoconference or it is even during a videoconference, the client control unit 21 can secure a content frame at an arbitrary timing, transmit a distribution request to the content distribution control unit 17, and display the content saved in the content recording unit 16 on the display unit 24 upon detection of input from the input unit 27.

Specifically, the client control unit 21 registers the distribution condition notified from the distribution condition management unit 12 (step S29). Then, the client control unit 21 stands by for detecting input to the input unit 27, the acoustic unit 26, and the image-capturing unit 25 during execution of the software for a videoconference or the like in the client terminal 20 with one or more other client terminals 20 (not illustrated) or even after termination of the software for a videoconference or the like (step S31). Each input example is described in the examples of "secure a content frame based on the use state of the client terminal" discussed above.

Upon detecting input corresponding to "content frame securing condition", the client control unit 21 secures a content frame for displaying content (step S34). Then, the client control unit 21 requests distribution of the content to the content distribution control unit 17 by using the information of "content stored location" received as the distribution condition as a distribution request (step S35).

As described, when there is specific input to the client terminal 20 for requesting distribution of content, the client control unit 21 secures a content frame according to "content frame securing condition", transmits a distribution request to the content distribution control unit 17, and displays the content saved in the content recording unit 16 on the display unit 24.

According to the embodiment, the client control unit 21 of the client terminal 20 can secure the content frame (time frame for displaying the content) for receiving distribution of the content including an advertisement or the like and display the content, so that the client terminal 20 can be utilized effectively. Furthermore, in the embodiment, securing a content frame upon termination of a videoconference leads to controlling idle time of the client terminal 20, so that it is possible to provide content at different timings for each of the places where the client terminals are installed. Furthermore, even during a videoconference, it is possible to secure a content frame by the input made by a viewer or automatic recognition through the input unit 27, the acoustic unit 26, and the image-capturing unit 25, and to display information of the content.

As described, by taking the unused time of the client terminal 20 or input or the like from the input unit 27, the acoustic unit 26, and the image-capturing unit 25 as "content frame securing condition", it is possible to secure a content frame at an arbitrary timing and provide the content for each of the client terminals 20.

Furthermore, since the client control unit 21 secures a content frame based on whether or not the use state of the client terminal 20 satisfies "content frame securing condition", the content is not distributed from the server 10 according to a unilateral schedule but the content from the server 10 can be received by the control of the client terminal 20 side. That is, it becomes possible to provide arbitrary content at an arbitrary timing for each of the client terminals 20, and to secure the content frame based on the unused state of the client terminal 20 until the content frame is released.

Furthermore, through adding and registering information regarding any of "region", "distribution permittance" of content, "viewer attribute", and "distribution excluded content" as the terminal information of the client terminal 20 by the client terminal management unit 11, it is possible to clarify the viewers of the client terminal 20.

Furthermore, by adding and registering information of "target attribute" as the content information by the content management unit 15, it can be used for narrowing down the intended clientele (target) of the content owner when providing the content. Furthermore, by having "content owner", "content type", "distribution period", "distribution time", and "region", the clientele (target) can be narrowed down further.

Furthermore, by performing matching of the content to be provided to the client terminal 20 based on such information included in the terminal information and the content information, the content including an advertisement or the like can be provided effectively for a great number of specific viewers that fit the needs of the content owner.

According to the embodiment, by installing the display unit 24 of the client terminal 20 in an open space where there is no limit in the number of viewers, it becomes possible to allow a large number of specific viewers around the installation place of the display unit 24 to freely view the content. "A large number of specific viewers" herein may mean the main user group of the client terminal 20 or may be employees who often sit near the installation place of the display unit 24 in a case where the present invention is applied to an office. For example, individuals may be identified by mobile terminals provided to the employees to define the attribute of the employees in the range capable of viewing the display on the display unit 24 or of the employee captured by the image-capturing unit 25. In the embodiment, it is used as the main user group of the client terminal 20 but not used to limit the number of viewers while narrowing down the attribute of the targets, thereby making it possible to allow a large number of viewers to view the content.

Next, described by referring to FIG. 8 and FIGS. 9(A)-(C) is processing when ending the display of the content and releasing the content frame on condition that there is input different from "content frame securing condition" made through the input unit 27 of the client terminal 20. Other than the input unit 27, input from the acoustic unit 26 or the image-capturing unit 25 to the client control unit 21 may be used as the condition for releasing the content frame, and the content frame may be released also upon reception of specific communication at the client control unit 21 transmitted from the server 10 side, use of the client terminal 20 for a different usage from delivery of the content (for example, starting a videoconference), or the like.

First, from a state during distribution of content (step S51), when input from the input unit 27 is detected (Yes in step S52), the client control unit 21 requests the content distribution control unit 17 to end the distribution (step S53). When the client control unit 21 does not detect input from the input unit 27 (No in step S52), the client control unit 21 continues display of the content.

Upon receiving the request to end the distribution, the content distribution control unit 17 ends the distribution of the content (step S54). Then, the client control unit 21 releases the content frame for displaying the content (step S55). Then, the processing corresponding to the input from the input unit 27 of the client terminal 20 is started (step S56).

According to the embodiment, the client control unit 21 secures a content frame based on whether or not the use state of the client terminal 20 satisfies "content frame securing condition". Therefore, it is possible to end the distribution of the content and release the content frame based on determination that the use state of the client terminal 20 does not satisfy "content frame securing condition". Furthermore, in a case where the client terminal 20 is used for a videoconference or the like, the client control unit 21 may request the content distribution control unit 17 to end the distribution upon receiving a start request of a videoconference for the client terminal 20 from one or more other client terminals when the content is being displayed on the display unit 24.

Furthermore, by referring to FIGS. 9(A)-(C), processing of the content distribution result management unit 18 that manages the content distribution result will be described. The explanation below is an outline in which some of its procedures is partially omitted from the explanation.

Figure 9A:
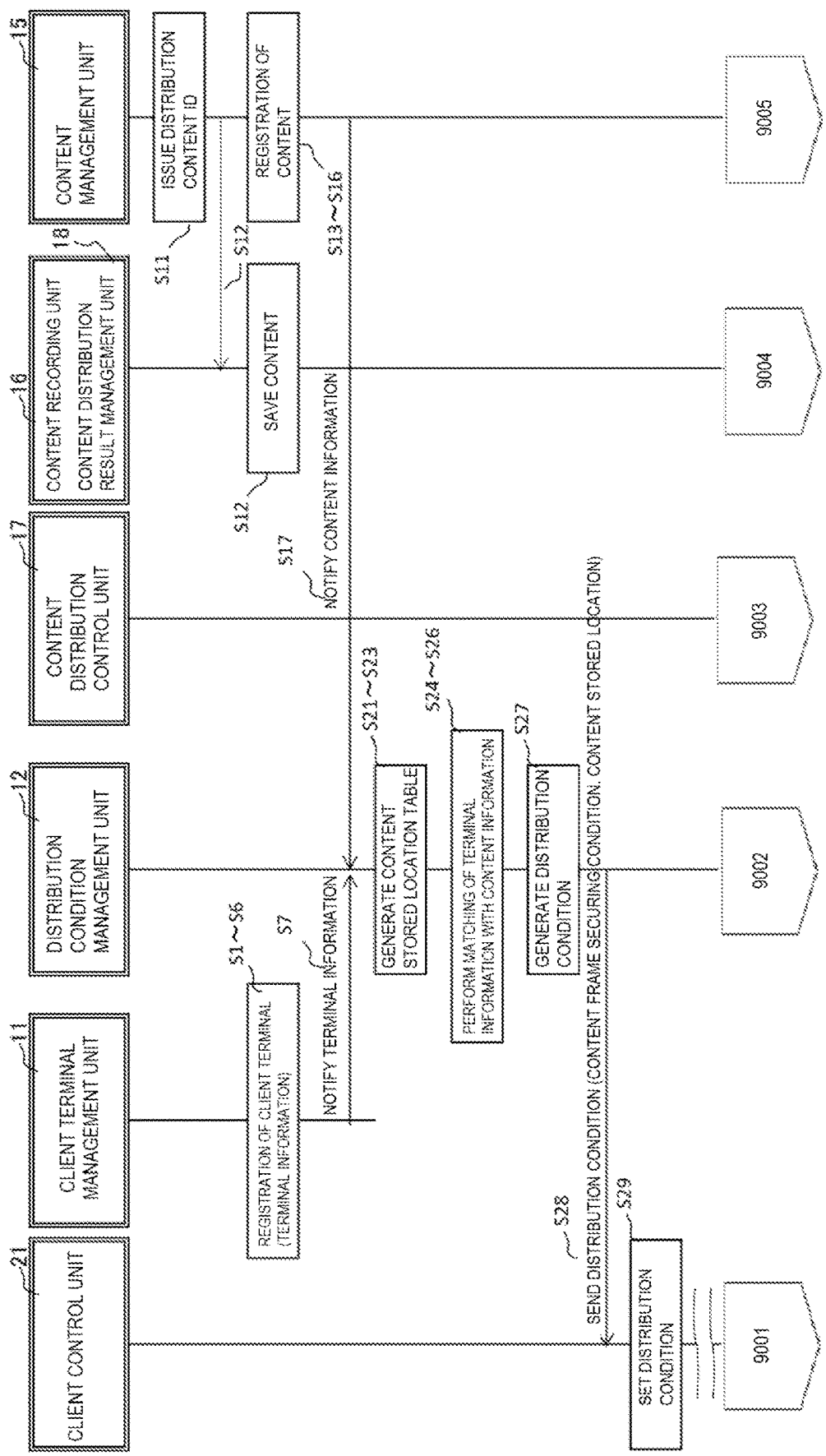

When the content distribution control unit 17 receives a distribution request from the client control unit 21 (step S35), the content distribution result management unit 18, upon start of content distribution (step S42), starts management of the content distribution result (step S60 illustrated in FIGS. 9(A)-(C)).

Then, when the request for ending the distribution is transmitted to the content distribution control unit 17 from the client control unit 21 (step S53), the content distribution control unit 17 ends the distribution from the content recording unit 16 (step S54), and the content distribution result management unit 18 stops management of the content distribution result (step S61 illustrated in FIGS. 9(A)-(C)).

When the content is distributed again by a distribution request from the client control unit 21, the content distribution result management unit 18 restarts the management of the content distribution result.

The distribution result is registered to "distribution result (seconds)" of the distribution result table illustrated in FIG. 3(D) by the content distribution result management unit 18. Note that "distribution result (seconds)" of the distribution result table illustrated in FIG. 3(D) indicates the accumulated distribution time of the content for each of the client terminal, and the distribution time may be counted successively or may be counted collectively by scheduled processing such as batch processing. Not the accumulated hour but the number of distributions may be counted as well. Note that "number of distributions (times)" of the distribution result table illustrated in FIG. 3(D) indicates the number of distributions, and the number of distributions may be counted successively or may be counted collectively by scheduled processing such as batch processing.

According to the embodiment, with the content distribution result management unit 18 that manages the content distribution result, "distribution result (number of distributions, distribution date/time, and the like)" can be managed by each content. Furthermore, although not described herein, it is possible to feed back the managed distribution result to the content owner, use it for marketing, use it as a reference for creating new content, and use it for billing.

An example of variations of a processing sequence illustrated in FIGS. 9(A)-(C) will be described hereinafter. While "content frame securing condition" and "content stored location" are collectively notified as the distribution condition from the distribution condition management unit 12 to the client control unit 21 in step S28, the distribution condition may be notified separately in a plurality of times. For example, "content frame securing condition" and "content stored location" may be notified by separate processing.

Specifically, the distribution condition management unit 12 in step S28 notifies only "content frame securing condition" to the client control unit 21 as the distribution condition (step S28) and, upon detecting termination of software for a videoconference or the like held with one or more other client terminals 20, the client control unit 21 starts measurement of the unused time of the client terminal 20 (step S32). Then, the client control unit 21 compares the unused time of the client terminal 20 included in "content frame securing condition" of the distribution condition with the measured time (step S33). In a case where "content frame securing condition (unused time)" ≤measured time (Yes in step S33), a content frame for displaying content is secured (step S34). Then, the client control unit 21 requests the content distribution control unit 17 to notify "content stored location", and the content distribution control unit 17 notifies "content stored location" to the client control unit 21 as the distribution condition (not illustrated). Then, the client control unit 21 may perform processing for transmitting a distribution request of content to the content distribution control unit 17 (step S35) by using, as the distribution request, "content stored location" received as the distribution condition.

Second Embodiment

Figure 10A:
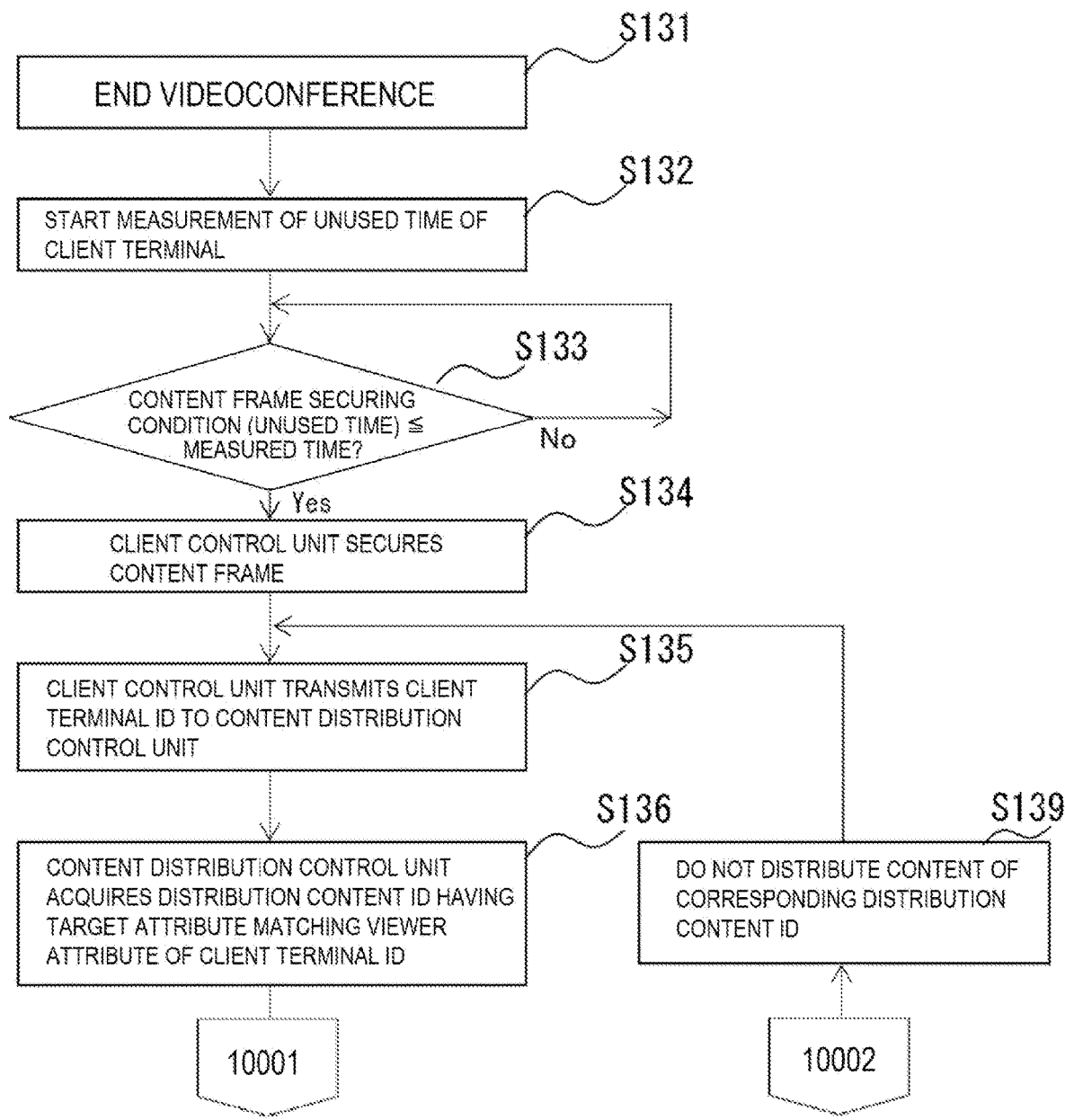
FIGS. 10(A) and 10(B) illustrate a flowchart of processing of a second embodiment according to the present invention for distributing and displaying content after a videoconference ends.
Figure 10B:
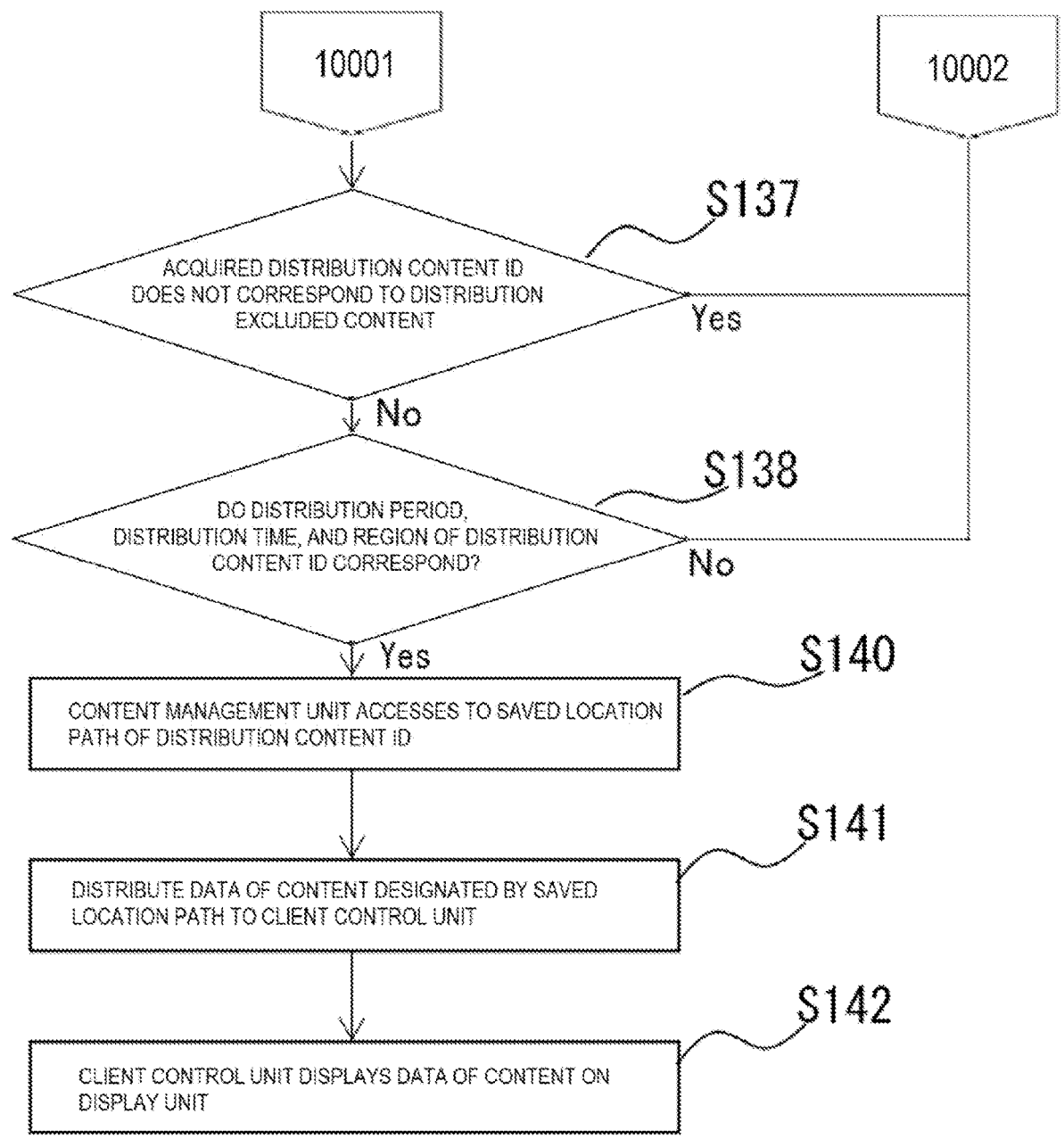

Next, by referring to FIGS. 10(A) and 10(B), a second embodiment of the present invention will be described.

In the second embodiment, for distributing content, the distribution condition management unit 12 notifies only "content frame securing condition" to the client control unit 21 as the distribution condition, and the client control unit 21 transmits only "client terminal ID" to the content distribution control unit 17 as the distribution request. In this case, every time a distribution request is received, the content distribution control unit 17 performs, for each "client terminal ID", matching of "distribution content ID" having "target attribute" that matches "viewer attribute" by using "client terminal ID" included in the distribution request.

Note that explanations of the processing duplicated for the first embodiment and the second embodiment are omitted.

The client control unit 21 requests the content distribution control unit 17 to distribute content by using information of own device such as "client terminal ID" as a distribution request (step S135).

The content distribution control unit 17 acquires "viewer attribute" of the terminal information illustrated in FIG. 2(A) by using "client terminal ID" included in the distribution request, and compares it with "target attribute" of the content information table illustrated in FIG. 3(A) to acquire "distribution content ID" having "target attribute that matches "viewer attribute" of the "client terminal ID". When there are a plurality of matched "distribution content IDs", all of those are acquired.

Then, by referring to "distribution excluded content" of the terminal information table included in the distribution condition, it is determined whether or not the acquired "distribution content ID" corresponds to "distribution excluded content" linked to "client terminal ID". In a case where "content type" written in "distribution excluded content" of the terminal information table matches "content type" written in the content information table or in a case where "excluded content owner" written in "distribution excluded content" of the terminal information table matches "content owner" written in the content information table, the matched "distribution content ID" is identified as "distribution excluded content" (Yes in step S137) and distribution of the content is stopped (step S139).

When determined not to correspond to the "distribution excluded content" (No in step S137), the content distribution control unit 17 refers to "distribution period" and "distribution time" of the content information table and determines whether "region" matches "region" written in the terminal information table so as to determine whether or not "distribution content ID" corresponds to the data/time and the area desired by the content owner (step S138).

When determined to correspond (Yes in step S138), the content distribution control unit 17 refers to the content path table illustrated in FIG. 3(C) and accesses to "saved location path" of "distribution content ID" saved in the content recording unit 16 (step S140). Data of the content is distributed to the client control unit 21 from the saved location registered in "saved location path" (step S141).

When determined not to correspond (No in step S138), distribution of the content is stopped (step S139), and only other corresponding content is distributed.

The client control unit 21 displays the received content on the display unit 24 (step S142). In this case, the content is displayed within the content frame.

As described, when a specific time has passed in which the client terminal 20 is not using the software for a videoconference or the like, the client control unit 21 can effectively utilize the unused time of the client terminal 20 by securing a content frame based on "content frame securing condition", transmitting a distribution request to the content distribution control unit 17, and displaying the content saved in the content recording unit 16 on the display unit 24.

Furthermore, by setting "viewer attribute" for each of the client terminals 20 and "target attribute" for each content and by matching a large number of specific viewers in the place where the client terminal 20 for displaying the content is installed with the target group as the desired viewers of the content owner (advertiser) before displaying the content, it is possible to distribute the content that is appropriate for the viewer of the attribute that fits the needs of the content owner for each of the client terminals 20.

Other Functions

Furthermore, as a function according to the present invention, while displaying content within a content frame, the content may include information of connection destination that can be connected with one or more other client terminals 20. Through enabling two-way communication with one or more other client terminals 20 by receiving input of the information of connection destination from the input unit 27 to the content displayed on the display unit 24, it becomes possible for the viewers to not only view the content provided unilaterally but to directly contact the connection destination.

Furthermore, as the functions of the videoconference system other than the input unit 27, by receiving sound collected by the microphone of the acoustic unit 26, sound produced from the speaker or the like, and an image captured by the camera of the image-capturing unit 25 as the input of the connection destination information in the content, it may be used like a videophone by being connected with one or more other client terminals 20. When the content owner has the client terminal 20, the viewer viewing the content can make an inquiry to the content owner about details displayed in the content, request for materials, go through a purchase procedure, have face-to-face communication, and the like.

Alternatively, a link to the WEB site of the content owner may be embedded in the content for making it possible to view the WEB site from the client terminal 20 by inputting the link from the input unit 27.

According to the embodiment, the client terminal 20 is capable of having two-way communication with one or more other client terminals 20, so that it is possible to have communication including a videoconference. Furthermore, when the content displayed on the display unit 24 includes the connection destination information for connecting with one or more other client terminals 20, it is possible to have two-way communication with one or more other client terminals 20 by receiving input from the input unit 27. Thereby, it becomes possible for the viewers to not only view the content unilaterally but to directly contact the connection destination.

In short, by making it possible to have a videoconference immediately after the content including an advertisement or the like, a new content providing system can be provided with which the viewer of the content can satisfy the needs such as being able to instantly order the interested content, ask a question, and have a conference, and with which the connection destination not only distribute the content unilaterally but can have reactions of the viewers instantly.

Furthermore, as an additional function of the content providing system, it is possible to add a function of detecting the number of viewers viewing the content, moving directions, action details, stay time, and the like.

Specifically, a viewable range of the display unit 24 is captured by the camera (desirable to be of a wide-angle lens) of the image-capturing unit 25. The viewers on the captured video are recognized by face recognition (gender, age, name, and the like), infrared detection (the number of viewers, moving directions, action details, stay time, and the like), or the like, for example. Through managing the recognized result by the content distribution result management unit 18 by linking it to "distribution content ID" being displayed, the viewing state and the like of the viewers can be managed.

Furthermore, instead of the camera of the image-capturing unit 25, a position information acquiring function (GPS, radio intelligence, or the like) of a mobile terminal device (not illustrated) may be used to identify the position information of the mobile terminal device of an individual viewing the display unit 24 and the personal information may be linked to "distribution content ID" being displayed to be managed by the content distribution result management unit 18.

The present invention can be embodied in a large number of forms without departing from the essential characteristic thereof. Accordingly, it is to be noted that the embodiments described above are illustrative only and not intended to limit the present invention.

The invention claimed is:

1. A content providing system comprising:
   a client terminal, the client terminal including:
      a display configured to display a content, the content relating to an advertisement for a user of the client terminal based on a use state of the client terminal by the user; and
      a client controller configured to secure a content frame in the display for providing the content when the client controller determines that a content frame securing condition is satisfied; and
   a server, the server being configured to:
      manage terminal information of the client terminal;
      prepare and manage content information of the content based on the use state and the terminal information of the client terminal;
      save the content prepared by the server into a storage;
      perform distribution control of the content; and
      generate a distribution condition based on the terminal information of the client terminal and the content information of the content, and notify the distribution condition to the client controller,
   wherein the client controller is further configured to:
      detect a termination of a videoconference software in the client terminal;
      measure an unused time of the client terminal after the termination of the videoconference software has been detected;
      determine whether the measured unused time satisfies the content frame securing condition;
      secure the content frame based on the distribution condition notified from the server when the client controller determines that the measured unused time satisfies the content frame securing condition; and
      transmit a distribution request of the content to server after the content frame has been secured,
   the server is configured to extract the content from the storage and distribute the content to the client terminal; and
   the client controller is configured to display the content distributed by the server on the display within the secured content frame.

2. The content providing system according to claim 1, wherein the terminal information of the client terminal includes a viewer attribute relating to the user and the content frame securing condition.

3. The content providing system according to claim 1, wherein the content information of the content includes a target attribute relating to the user.

4. The content providing system according to claim 1, wherein
   the server is further configured to:
      manage the content information having a target attribute of the content information matching a viewer attribute relating to the user of the terminal information; and
      generate and notify to the client controller, the distribution condition including the content frame securing condition of the terminal information.

5. The content providing system according to claim 1, wherein the client controller is further configured to manage the use state of the client terminal.

6. The content providing system according to claim 1, wherein
   the distribution condition includes distribution permission information included further in the terminal information, and
   the client controller is configured to determine whether or not to secure the content frame based on the distribution permission information included in the distribution condition.

7. The content providing system according to claim 1, wherein
   the server is further configured to manage a distribution result of the content.

8. The content providing system according to claim 1, wherein
   the client terminal further includes an input interface, and
   the client terminal is configured to have two-way communication with one or more other client terminals by inputting connection destination information for connecting with the one or more client terminals via the input interface.

9. The content providing system according to claim 8, wherein the content includes the connection destination information, and the two-way communication with the one or more client terminals is configured to be made by receiving input of the connection destination information made in the content displayed on the display via the input interface.

10. The content providing system according to claim 1, wherein
the client terminal further includes a camera, a microphone, and a speaker,
the display is installed in an open space where there is no limit in the number of viewers, and
the client terminal is configured to hold a videoconference with one or more other client terminals.

11. The content providing system according to claim 1, wherein
the client controller is configured to determine that the measured unused time satisfies the content frame securing condition when the measured unused time is equal to or exceeds a predetermined period of time.

12. A content providing method for providing a content based on a use state of a client terminal, the content providing method comprising the steps of:
preparing and manacling content information of the content based on the use state and terminal information of the client terminal, the content relating to an advertisement for a user of the client terminal based on the use state of the client terminal by the user;
saving the content into a storage;
detecting a termination of a videoconference software in the client terminal;
measuring an unused time of the client terminal after the termination of the videoconference software has been detected;
determining whether the measured unused time satisfies a content frame securing condition;
generating a distribution condition based on the terminal information of the client terminal and the content information of the content, and notifying the distribution condition to the client terminal;
securing a content frame in a display of the client terminal for providing the content based on the notified distribution condition when the measured unused time satisfies the content frame securing condition;
extracting the content from the storage and distributing the saved content to the client terminal; and
displaying the distributed content within the secured content frame.

13. The content providing method according to claim 12, wherein
the measured unused time satisfies the content frame securing condition when the measured unused time is equal to or exceeds a predetermined period of time.

\* \* \* \* \*